United States Patent
Smith et al.

(10) Patent No.: US 11,597,044 B2
(45) Date of Patent: Mar. 7, 2023

(54) COMPOSITE ASSEMBLY FOR UNHARDENED FUSELAGE COMPONENTS

(71) Applicant: The Boeing Company, Chicago, IL (US)

(72) Inventors: Daniel R. Smith, Woodinville, WA (US); Darrell D. Jones, Mill Creek, WA (US); Paul T. Pritchard, Renton, WA (US); Jason A. Medenciy, Seattle, WA (US); Stephen Keith Kirchmeier, Bothell, WA (US); Kurtis Shuldberg Willden, Kent, WA (US); Robert William Whiting, St. Louis, MO (US); Michael Beerman, Bellevue, WA (US); Raviendra Sidath Suriyaarachchi, Kirkland, WA (US); Jeremy Evan Justice, Mill Creek, WA (US); Paul Chace Wilcoxson, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/454,283

(22) Filed: Nov. 10, 2021

(65) Prior Publication Data

US 2022/0152759 A1   May 19, 2022

Related U.S. Application Data

(60) Provisional application No. 63/115,051, filed on Nov. 18, 2020.

(51) Int. Cl.
*B23P 21/00* (2006.01)
*B64F 5/10* (2017.01)
(Continued)

(52) U.S. Cl.
CPC .......... *B23P 21/004* (2013.01); *B29C 70/342* (2013.01); *B29C 70/545* (2013.01);
(Continued)

(58) Field of Classification Search
CPC . B23P 21/004; B23P 2700/01; B23P 2700/12; B29C 70/342; B29C 70/545;
(Continued)

(56) References Cited

U.S. PATENT DOCUMENTS

| | | | | |
|---|---|---|---|---|
| 4,462,787 A | * | 7/1984 | Bogardus, Jr. | ........ B29C 53/824 425/DIG. 14 |
| 2001/0054228 A1 | * | 12/2001 | Lehmker | ................ B21J 15/142 29/721 |
| 2008/0230652 A1 | * | 9/2008 | Biornstad | ............... B29C 70/44 244/120 |

FOREIGN PATENT DOCUMENTS

| | | |
|---|---|---|
| EP | 2857186 A2 | 4/2015 |
| WO | 2006001860 A2 | 1/2006 |

(Continued)

OTHER PUBLICATIONS

Netherlands Patent Office Written Opinion and Search Report with English Translation, dated Jun. 28, 2021, regarding Application No. NL2027399; 9 pages.

(Continued)

*Primary Examiner* — Jun S Yoo
(74) *Attorney, Agent, or Firm* — Yee & Associates, P.C.

(57) ABSTRACT

Systems and methods are provided for fabricating a preform for a fuselage section of an aircraft. The method includes advancing a series of arcuate mandrel sections in a process direction through an assembly line, laying up fiber reinforced material onto the arcuate mandrel sections via layup stations, uniting the series of arcuate mandrel sections into (Continued)

a combined mandrel; and splicing the fiber reinforced material laid-up onto the arcuate mandrel sections.

30 Claims, 20 Drawing Sheets

(51) Int. Cl.
  *B64C 1/06* (2006.01)
  *B29C 70/54* (2006.01)
  *B29C 70/34* (2006.01)
  *B29L 31/30* (2006.01)
(52) U.S. Cl.
  CPC ............... *B64C 1/064* (2013.01); *B64F 5/10* (2017.01); *B23P 2700/01* (2013.01); *B23P 2700/12* (2013.01); *B29L 2031/3082* (2013.01)
(58) Field of Classification Search
  CPC ... B29C 70/462; B64F 5/10; B29L 2031/3082
  See application file for complete search history.

(56) References Cited

FOREIGN PATENT DOCUMENTS

| | | | |
|---|---|---|---|
| WO | 2008133748 | A2 | 11/2008 |
| WO | 2013153537 | A2 | 10/2013 |

OTHER PUBLICATIONS

European Patent Office Extended Search Report, dated Mar. 21, 2022, regarding Application No. EP21207356.3, 9 pages.

\* cited by examiner

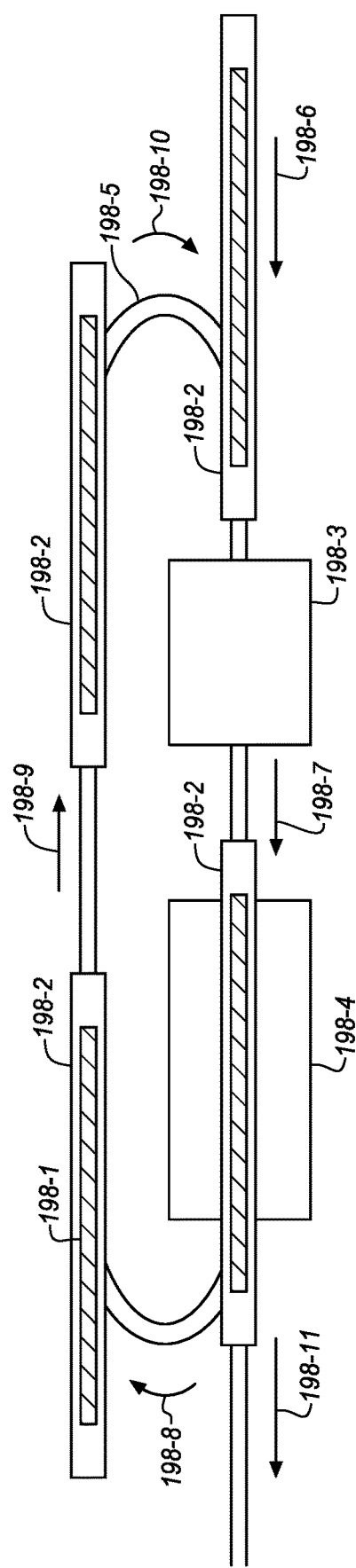

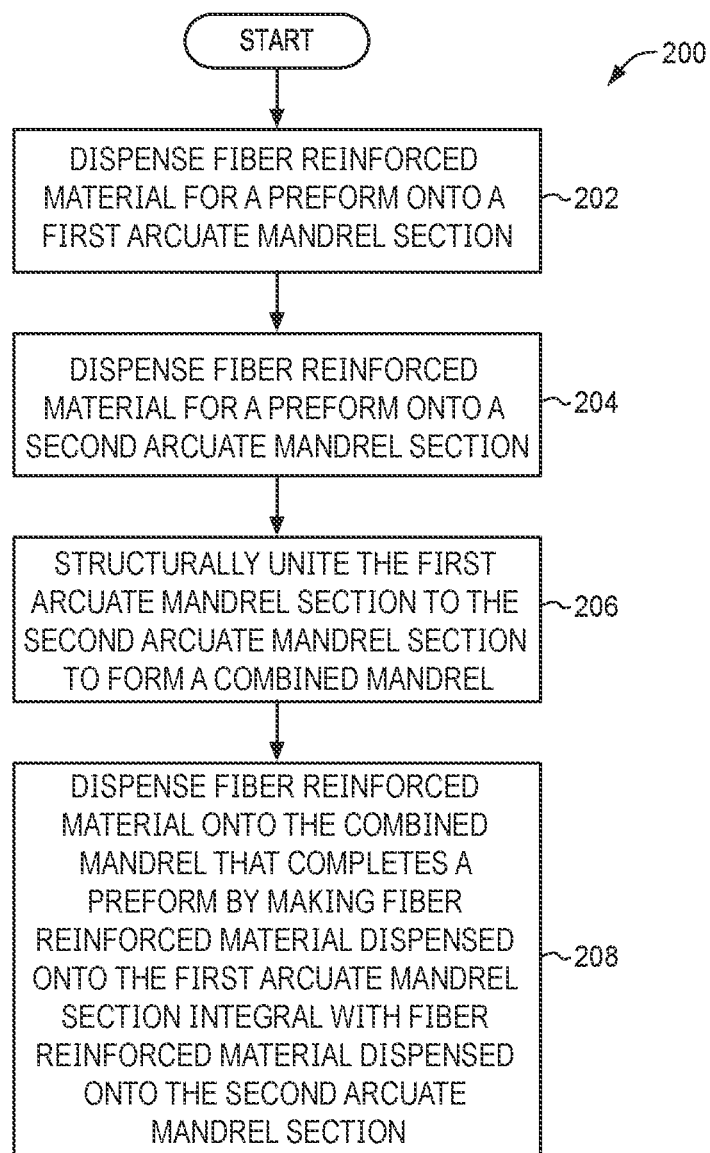

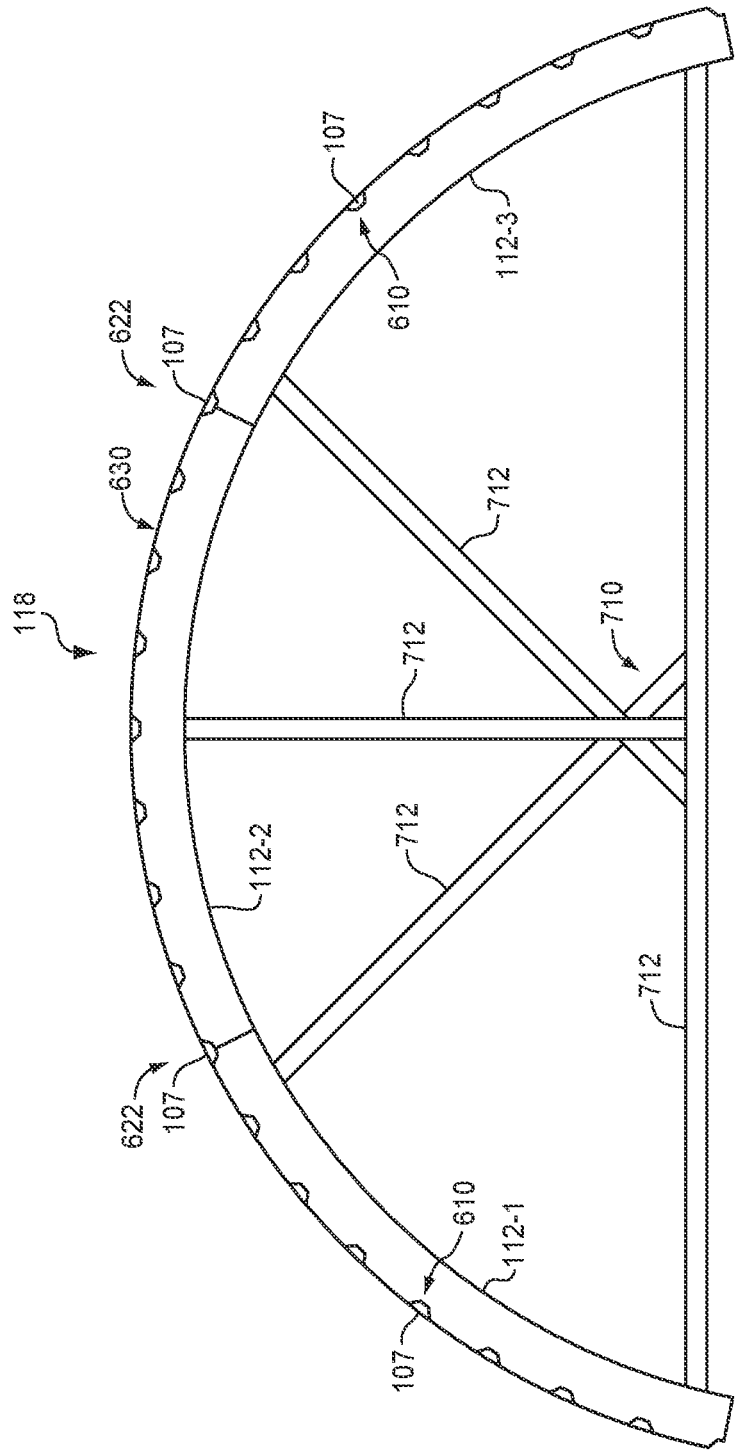

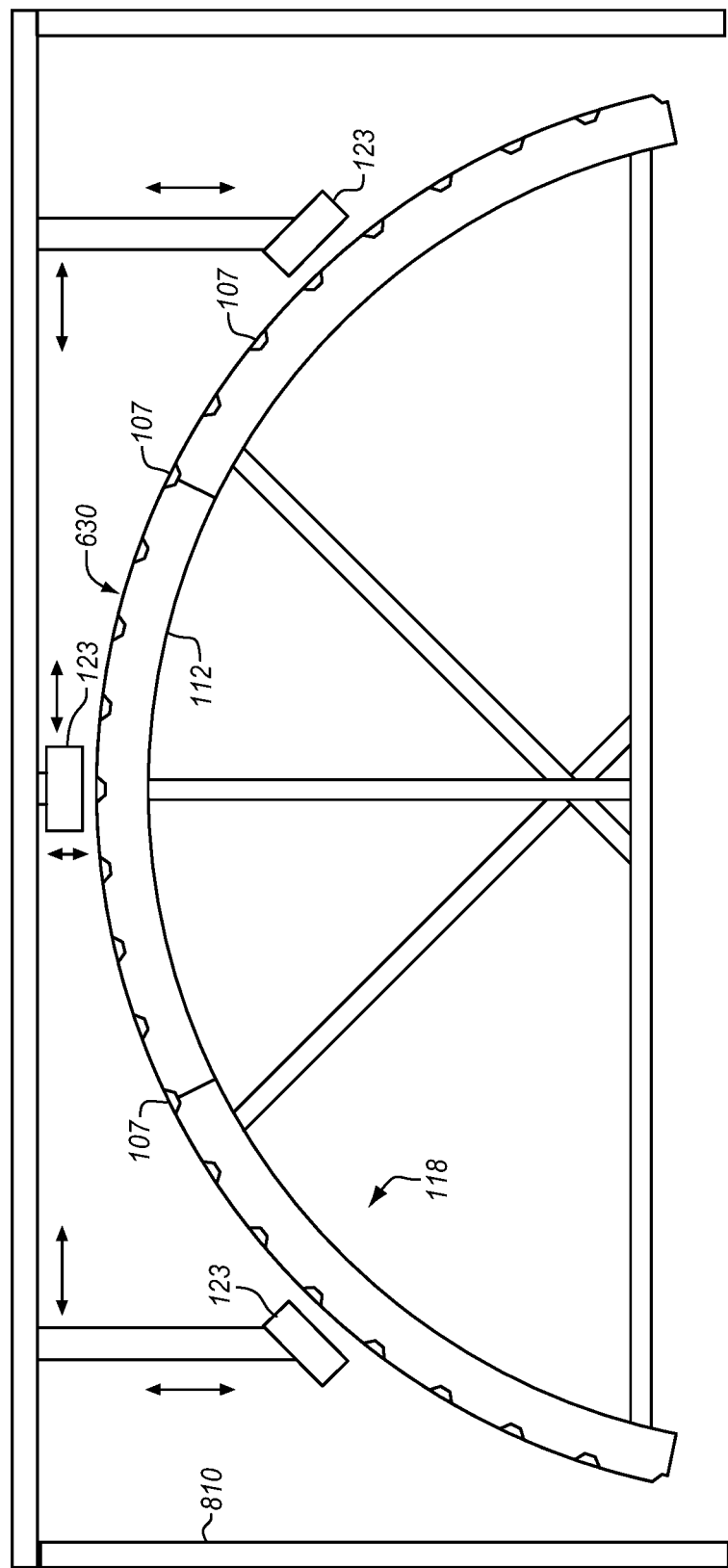

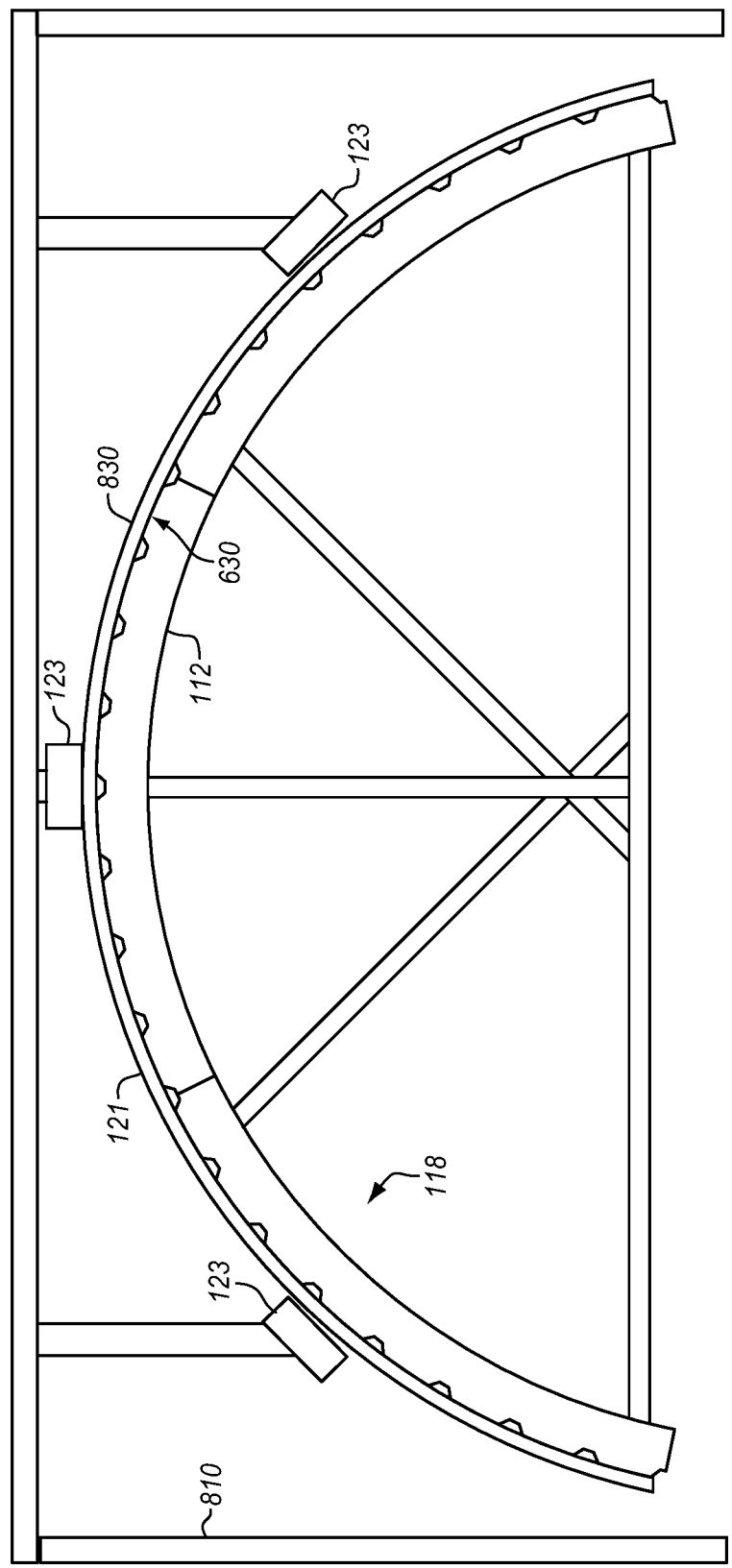

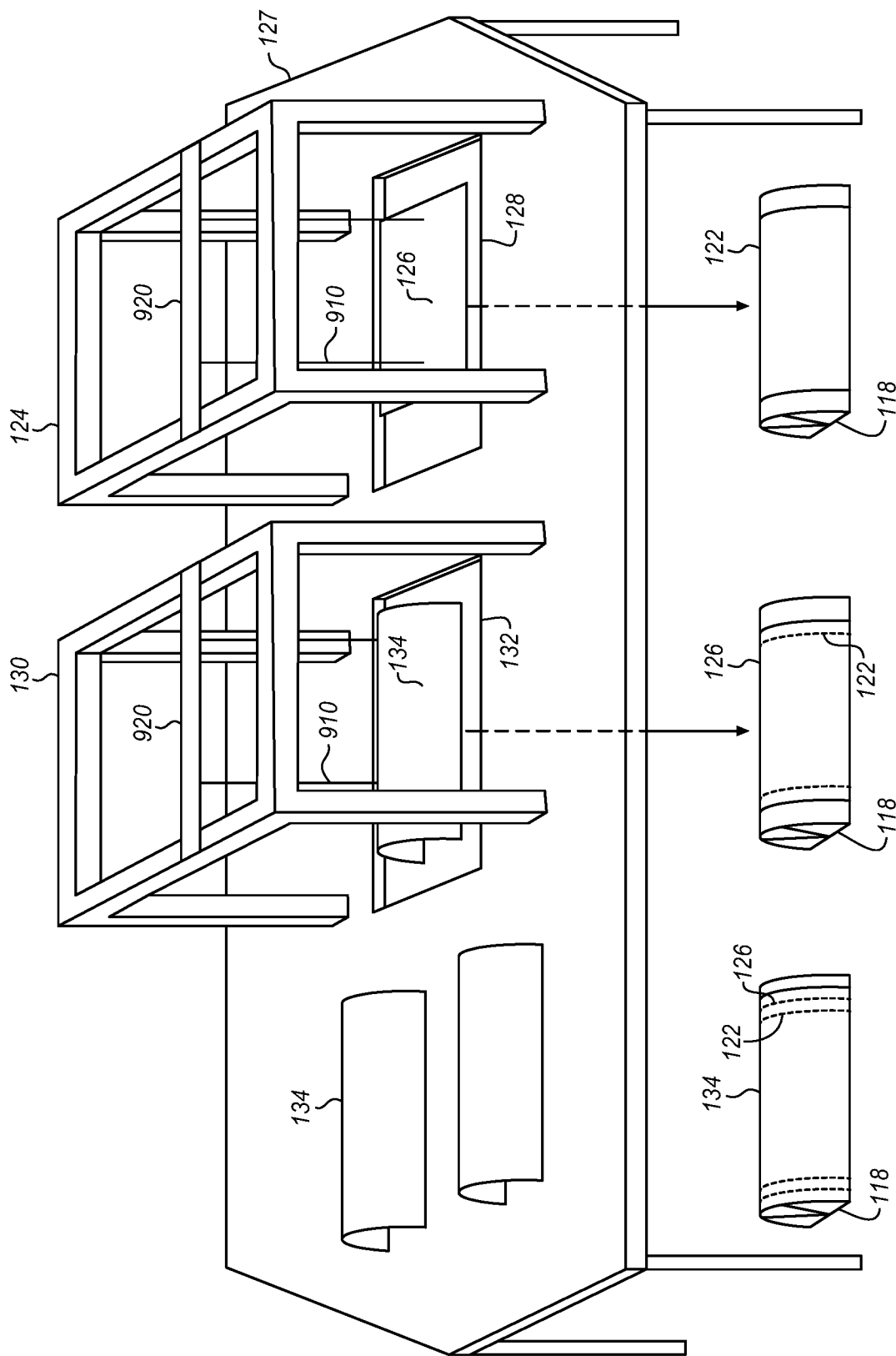

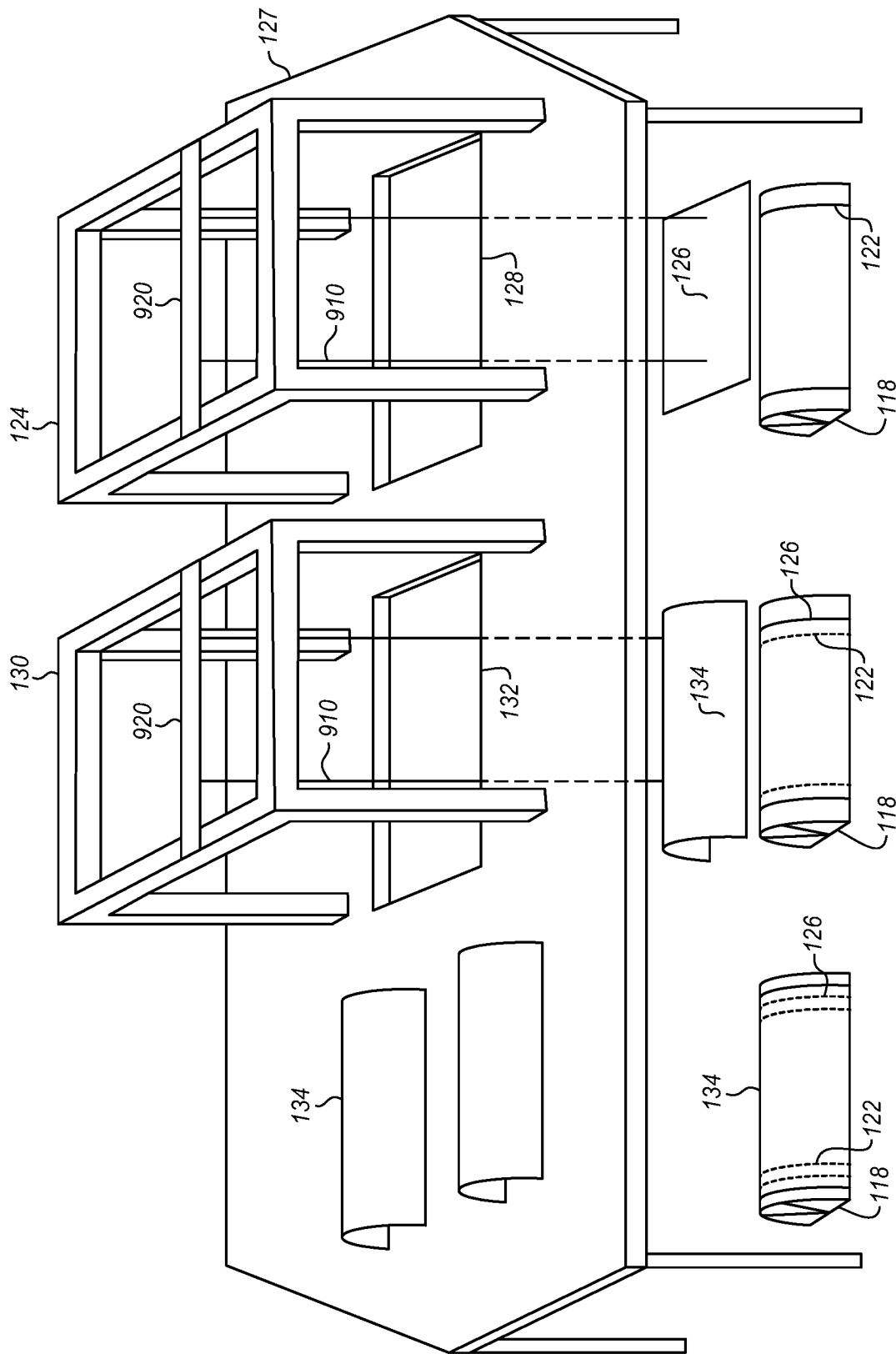

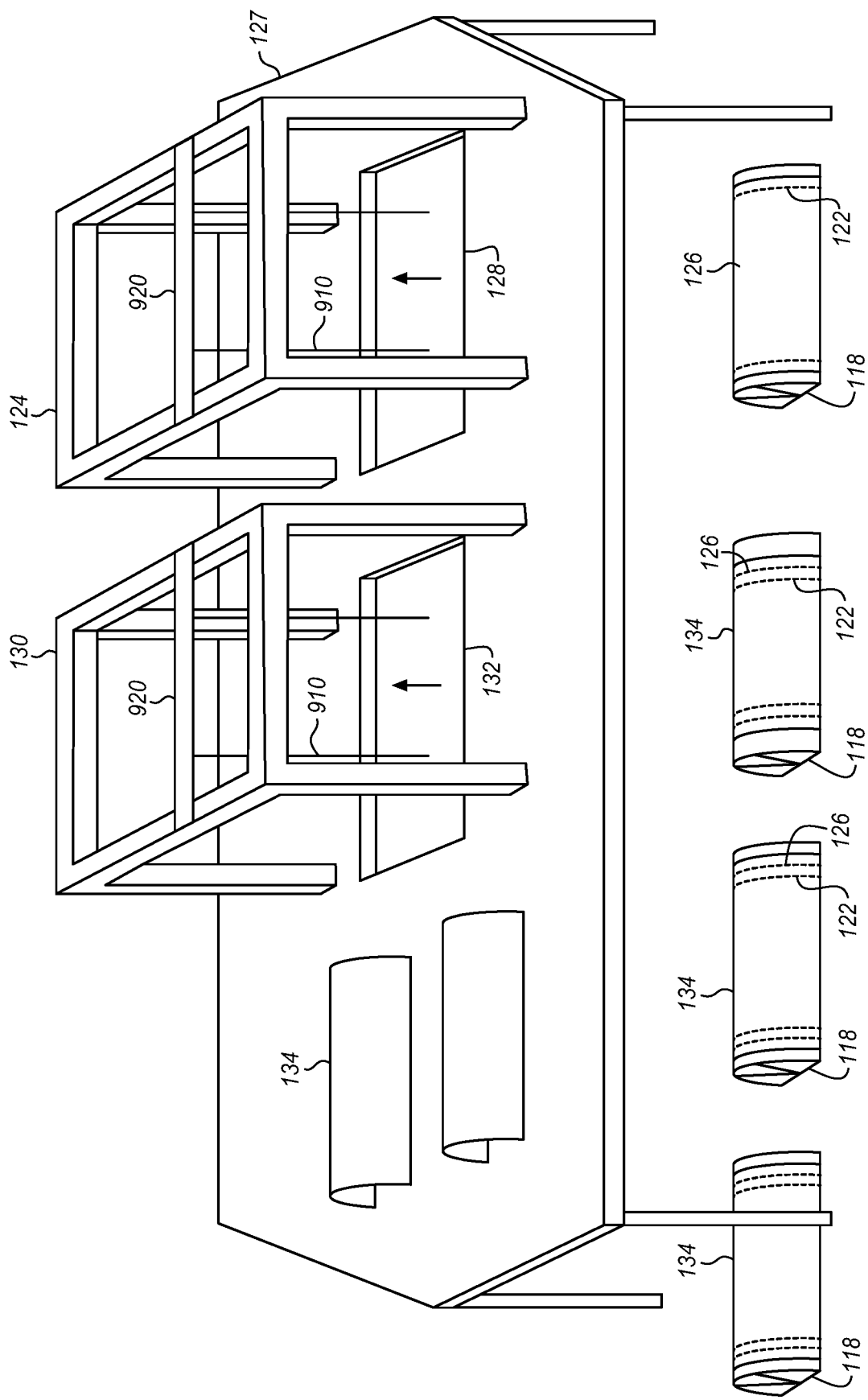

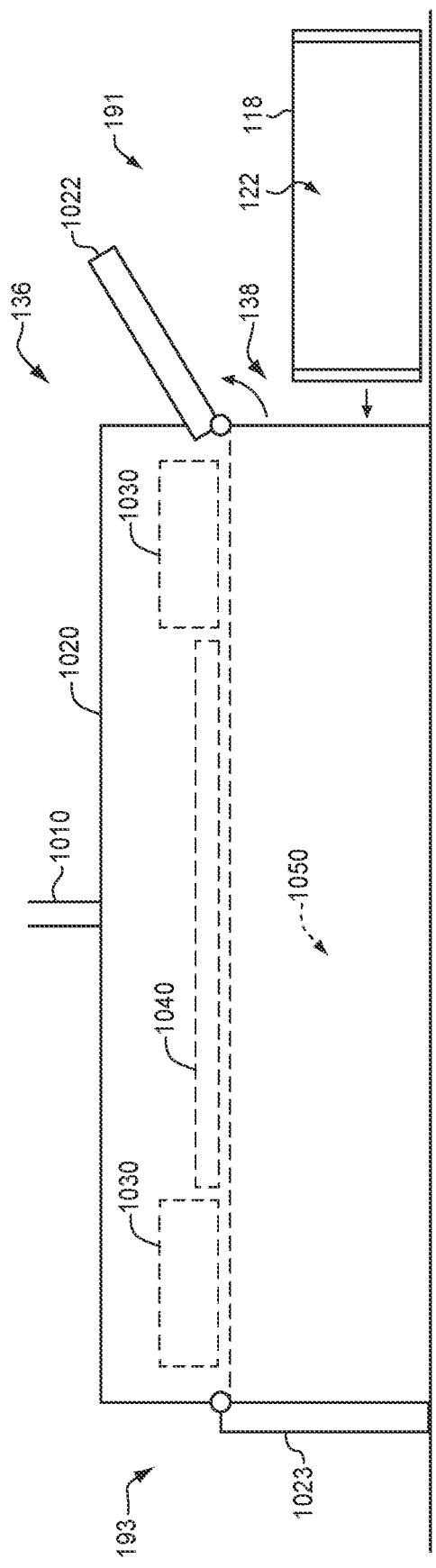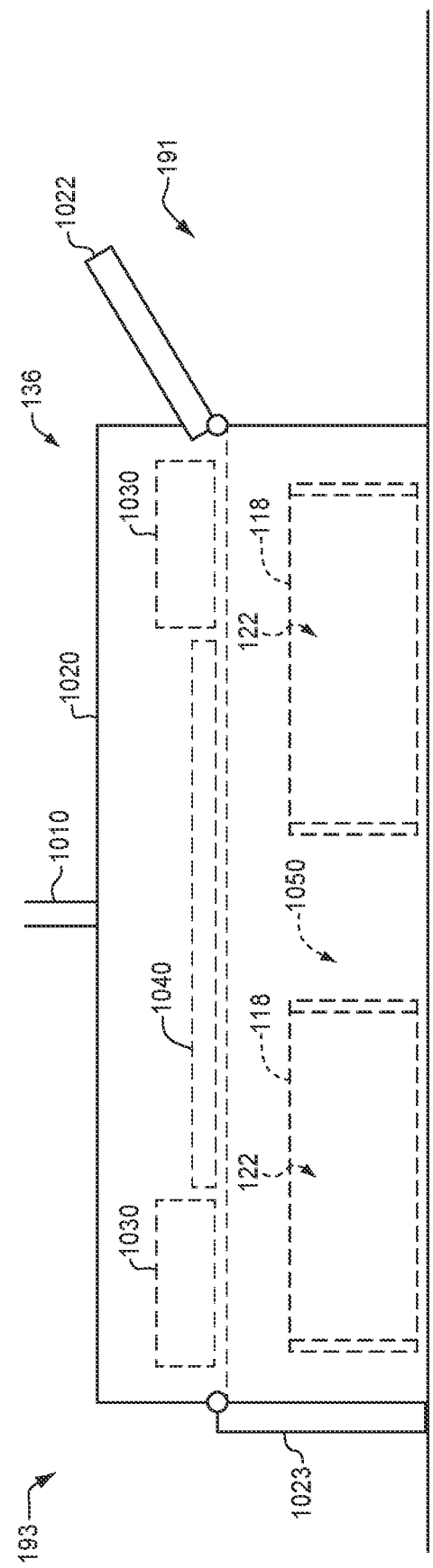

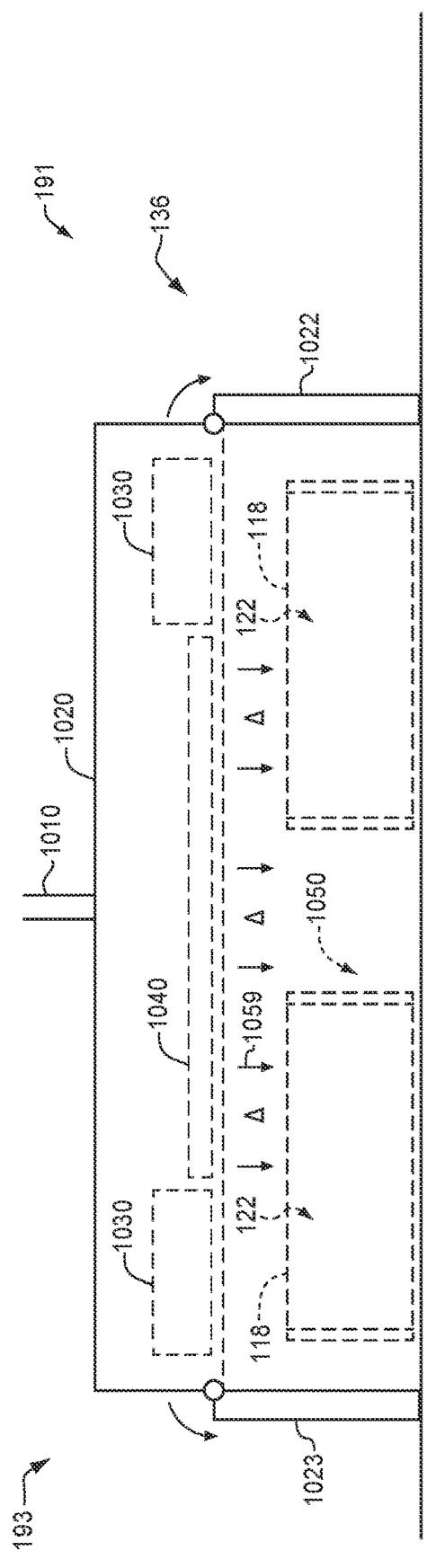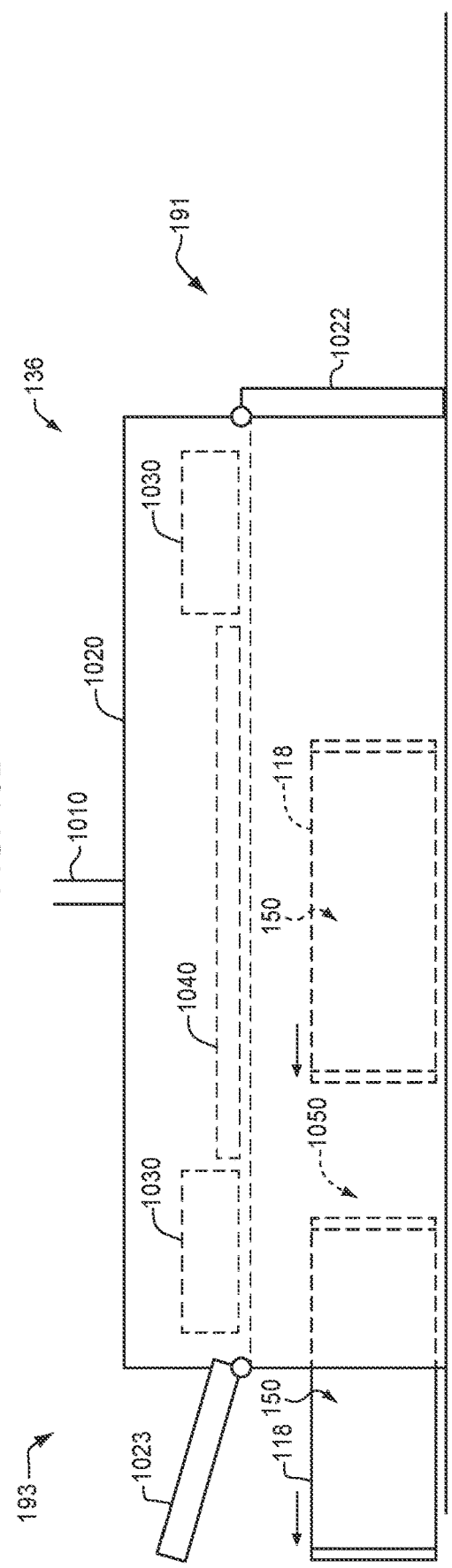

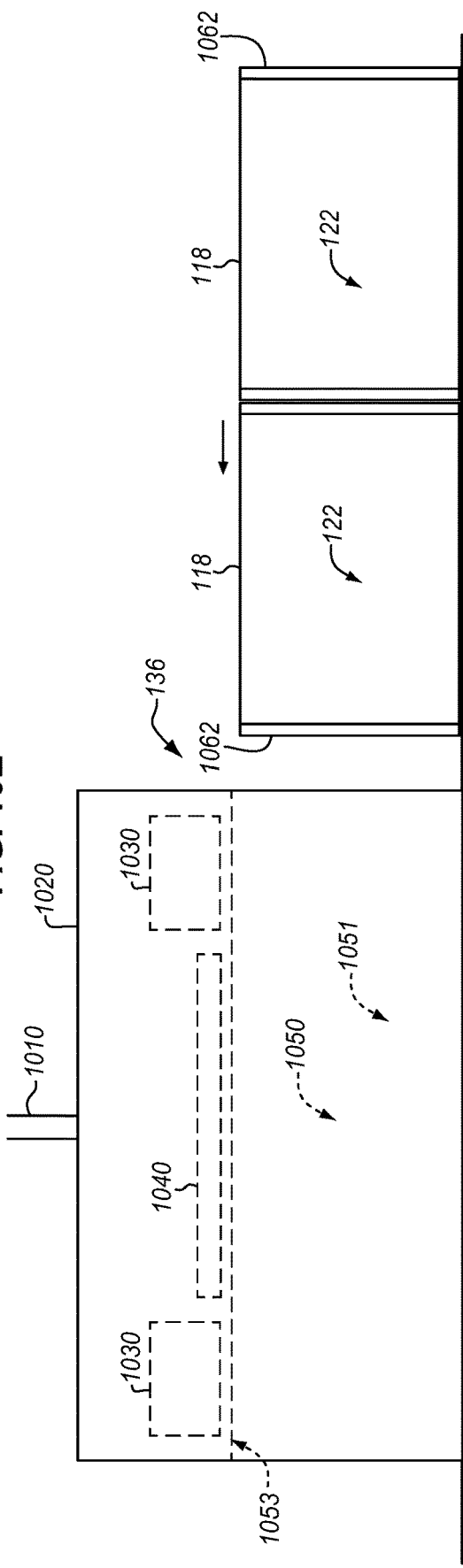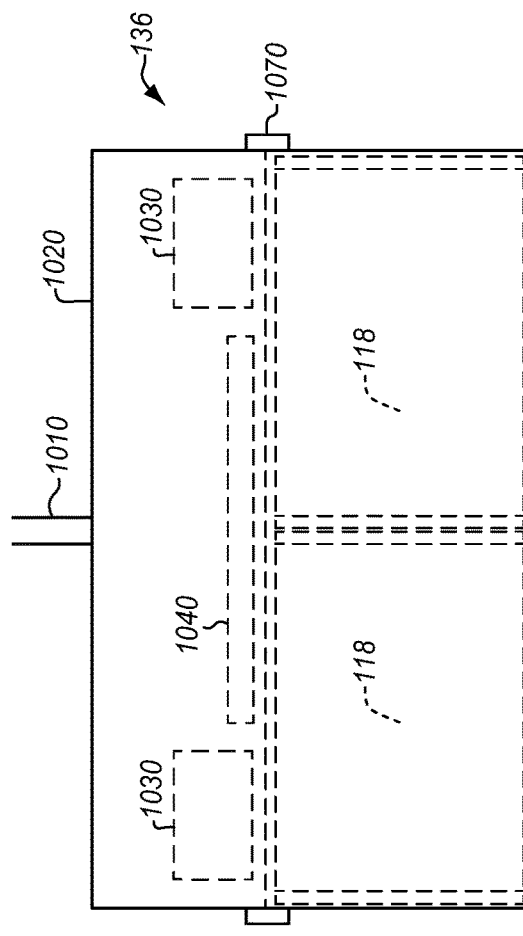

COMPOSITE ASSEMBLY FOR UNHARDENED FUSELAGE COMPONENTS

CROSS-REFERENCE TO RELATED APPLICATION

This application claims the benefit of U.S. Provisional Patent Application Ser. No. 63/115,051 filed Nov. 18, 2020, and entitled "Composite Assembly for Unhardened Fuselage Components" which is incorporated herein by reference in its entirety.

FIELD

The disclosure relates to the field of fabrication, and in particular, to fabrication of airframes for aircraft.

BACKGROUND

Large composite parts, such as those spanning tens of feet, occupy substantial space within a factory floor. Preforms for these parts are laid up on a layup mandrel in a stationary work cell. The work cell includes an Automated Fiber Placement (AFP) machine, comprising a massive end effector for a large robot arm. The end effector proceeds traverse the cell and to add fiber-reinforced material on a tow-by-tow basis. Thus, the lone AFP machine traverses the entire layup mandrel singularly according to an optimized layup pattern.

Present techniques for fabricating large composite parts therefore require a substantial amount of time in order for the layup mandrel to be indexed and then for a preform to be laid-up. Therefore, it would be desirable to have a method and apparatus that take into account at least some of the issues discussed above, as well as other possible issues.

SUMMARY

Embodiments described herein provide assembly-line systems and techniques for fabricating preforms that will be hardened into sections of fuselage for an airframe of an aircraft. The systems include stations that are arranged in a process direction traveled by a layup mandrel. The layup mandrel continues along the process direction to receive additional fiber reinforced components as it travels, until a completed preform for a section of fuselage is fabricated at the layup mandrel. By subdividing the operations of layup and compaction across the stations of the assembly line, overall fabrication speed is rapidly increased without the need for specialized machinery. Furthermore, this arrangement ensures that transportation of the laminate includes value-added time during which layup, compaction, and other operations can occur.

One embodiment is a method for fabricating a preform for a fuselage section of an aircraft. The method includes advancing a series of arcuate mandrel sections in a process direction through an assembly line; placing stringer preforms onto the arcuate mandrel sections via stringer placement stations; uniting the series of arcuate mandrel sections into a combined mandrel; and laying up fiber reinforced material onto the combined mandrel and the stringer preforms.

In another aspect, a system for fabricating a preform for a fuselage section of an aircraft is provided. The system includes a series of arcuate mandrel sections that are advanced in a process direction through an assembly line, at least one stringer placement station operable to place stringer preforms onto the arcuate mandrel sections, at least one mandrel assembly station operable to unite the series of arcuate mandrel sections into a combined mandrel, and at least one layup station operable to layup fiber reinforced material onto the combined mandrel and the stringer preforms.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 1C depicts a conceptual assembly arrangement in an illustrative embodiment.

FIG. 2 is a flowchart illustrating a method for operating the assembly line of FIG. 1A in an illustrative embodiment.

FIGS. 7A-7B illustrate a combined mandrel, assembled from a number of arcuate mandrel sections, which receive stringer preforms in an illustrative embodiment.

FIGS. 8A-8B depict layup of skin plies onto a combined mandrel in an illustrative embodiment.

FIGS. 9A-9C illustrate layup of an Interwoven Wire Fabric (IWWF) layer for a preform, as well as placement of a caul plate onto a preform in an illustrative embodiment.

FIGS. 10A-10D depict hardening of multiple combined mandrels within an autoclave in an illustrative embodiment.

FIGS. 10E-10F depict hardening of a multiple combined mandrels within an autoclave in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The fuselage sections described herein comprise one or more composite parts. Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1A:
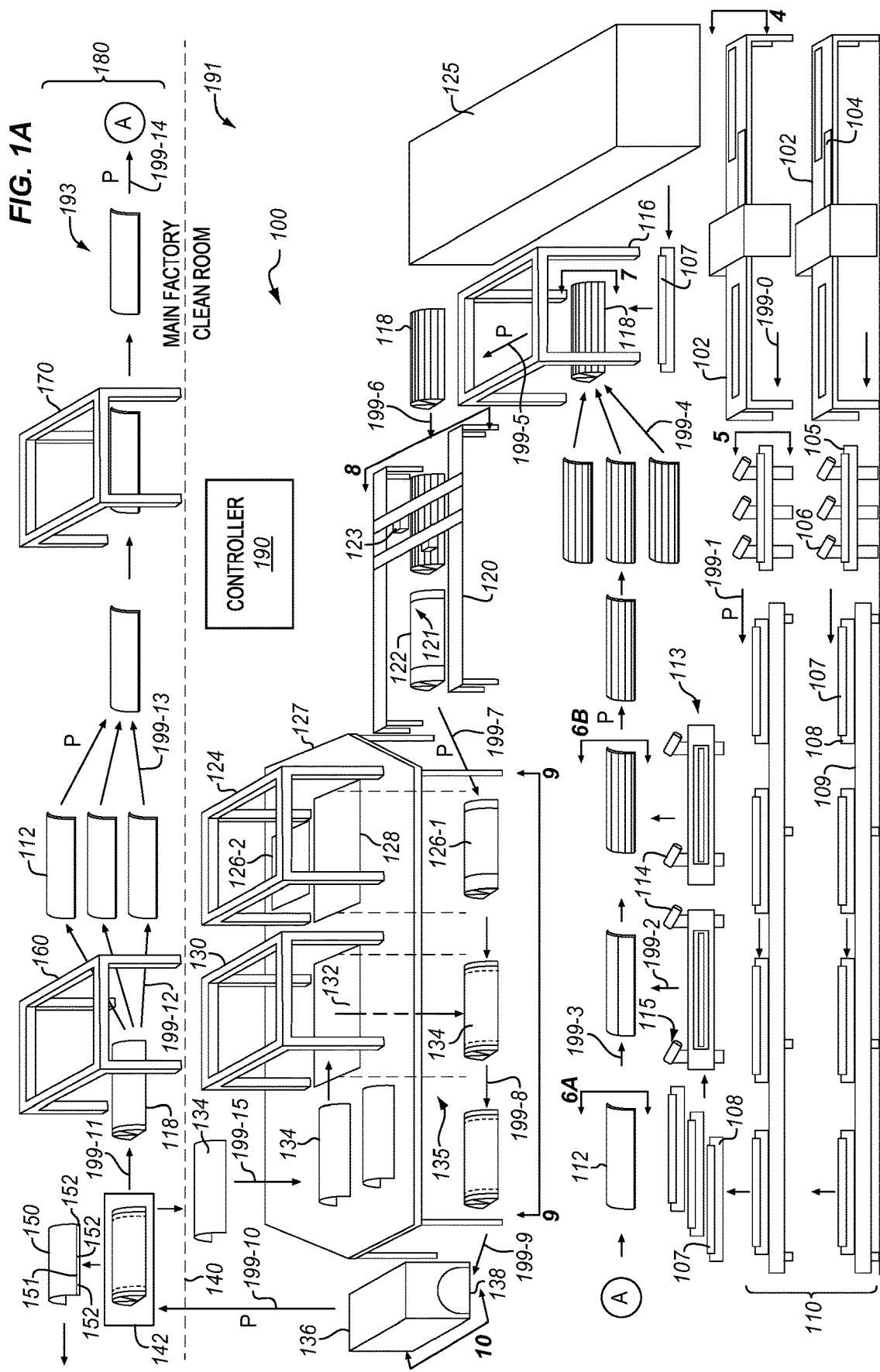
FIG. 1A illustrates an assembly line that fabricates a preform for a section of fuselage in an illustrative embodiment.

FIG. 1A illustrates an assembly line 100 that fabricates a preform 122 for a section of fuselage in an illustrative embodiment. In this embodiment, the assembly line 100 performs a variety of fabrication processes that together result in a preform 122 for hardening into a composite part. Movement proceeds along process directions 199-0 through 199-15 during these operations. Assembly line 100 includes stringer fabrication lines 110, which create stringer preforms 107. The stringer preforms 107 are placed onto arcuate mandrel sections 112, which are later assembled together to form a combined mandrel 118. In one embodiment, placing the stringer preforms 107 is performed during pauses between pulses of the arcuate mandrel sections 112. In another embodiment, placing the stringer preforms 107 is performed during continuous processing of the arcuate mandrel sections 112.

Arcuate mandrel sections 112 are structurally united into a combined mandrel 118. While in the illustrated embodiments the combined mandrel 118 is illustrated as being for a half-barrel section of fuselage, there are embodiments for a full-barrel section of fuselage as well as embodiments for something other than a half-barrel or full-barrel fuselage section.

The combined mandrel 118 has one or more layers of fiber reinforced material 121 laid-up onto it. These layers of fiber reinforced material 121 unite stringer preforms 107 at the combined mandrel 118 into an integral whole, resulting in a preform 122 for an arcuate section of fuselage. A caul plate 134 is sealed to the combined mandrel 118 around the preform 122, and the preform 122 is hardened within an autoclave 136 (e.g., a pass-through autoclave) into a composite part 150 (e.g., during an autoclave curing cycle). Thus, in this embodiment the caul plate 134 operates as a vacuum bag as well as a caul plate. The composite part 150 is demolded, and the combined mandrel 118 is disassembled and cleaned in order to enable re-use of arcuate mandrel sections 112 on the assembly line 100. That is, after cleaning, the arcuate mandrel sections 112 return to position A indicated on the left side of the page, in order to receive another iteration of work.

The various stations illustrated in FIG. 1A are each designed to perform their work within a specific period of time. For example, the amounts of work assigned to the stations may be tailored so that each station can perform its work during a uniform pause (e.g., a pause shared by/synchronized across multiple stations at the assembly line 100) between pulses of a stringer preform 107, an arcuate mandrel section 112, and/or a combined mandrel 118. In one embodiment, an integer number of the pauses (which are equal, and performed synchronously across stringer preforms 107, arcuate mandrel sections 112, and/or combined mandrels 118) is equal to a hardening time for the stringer preform 107. In further embodiments, pauses are synchronized for stations working on the same components, but are not shared across different types of components. For example, stations that perform stringer fabrication synchronize to pauses, stations that perform layup onto an arcuate mandrel section 112 synchronize to different pauses, and stations that perform work on combined mandrels 118 synchronize to other pauses. In some embodiments, the larger pauses are integer multiples of the smaller pauses. In still further embodiments, some portions of the assembly line 100 are continuously operated, while others are pulsed.

All of the operations discussed above are performed in conformance with desired takt times for the preforms 122. Enforcing a uniform work time across multiple stations enables operations between the stations to be coordinated and synchronized according to a common schedule. In one embodiment, advancing comprises enforcing a uniform work time across multiple stations within which the laying up, uniting, and splicing is performed enabling operations between the stations to be coordinated and synchronized according to a common schedule. In one embodiment, each of the stations performs an amount of work based on the time span of a heating cycle of autoclave 136. Thus, in one embodiment the amount of time spent by a stringer preform 107, arcuate mandrel section 112, or combined mandrel 118 during a pause at each station is equal to the expected hardening time for the preform 122 at the autoclave 136 (or is equal to a period of time that the hardening time is evenly divisible by). This enables various components to be advanced synchronously, either continuously or in a pulsed fashion, across a number of stations in lock step with hardening processes performed at the autoclave 136. Subdividing the fabrication of large structures into fabrication of smaller structures for processing and assembly allows for implementation of parallel processing and assembly of the smaller structures, increasing overall throughput and fabrication speed for the large structures.

In still further embodiments, components that are utilized as inputs to the stations of assembly line 100 are fabricated in a Just-In-Time (JIT) manner by feeder lines, further described below, that supply the components directly to the stations. Providing components JIT to the stations reduces the amount of space needed at the factory for storage, as well as the amount of space needed for lanes that transport materials from storage to the stations. In some embodiments, the components provided by a single line (e.g., stringer preforms 107) vary slightly from each other, and the specific type of component needed at a point in time is provided in a JIT manner.

With this broad understanding of the assembly line 100 in place, further details of individual components of the assembly line 100 are provided below. In this embodiment, stringer fabrication lines 110 each include lamination stations 102, which lay up and trim flat charges 104 of fiber reinforced material (e.g., unhardened CFRP). These flat charges 104 may additionally receive Fluorinated Ethylene Propylene (e.g., FEP) layers, isolation plies (e.g., fiberglass plies that electrically insulate carbon fiber from aluminum components), etc. The flat charges 104 advance in process direction 199-0 to forming stations 106.

The flat charges 104 are shaped into stringer preforms 107 by forming stations 106 onto mandrels 105. After forming, the stringer preforms 107 are moved in process direction 199-1 and placed onto trays 108 which proceed along track 109 (e.g., a powered conveyor or other component). The track 109 can be linear or can be arranged in a race track (e.g., a loop) layout wherein one or more stringer preforms 107 enter the track 109 and exit when layup and forming is complete (e.g., after layup continues during one or more traversals of the loop by a stringer preform 107). In one embodiment, multiple lamination stations 102 are followed by multiple forming stations 106, respectively aligned along the track 109. Within the track 109 mandrels 105 cycle through the same lamination station 102 followed by the same forming station 106 multiple times before exiting the track 109. Further details of this arrangement are depicted with respect to FIG. 1C below. Depending on design, the trays 108 store either one or a plurality of stringer preforms 107.

Stringer placement stations 113, such as Pick and Place (PNP) stations 114, place the stringer preforms 107 from the trays 108 and onto arcuate mandrel sections 112 in process direction 199-2. In one embodiment, the PNP stations 114 (comprising PNP machines 115) pick and place a single stringer preform 107 at a time, while in other embodiments, the PNP stations 114 each pick and place a batch of stringer preforms 107 at once onto an arcuate mandrel section 112 advancing in a process direction 199-3. Additional ones of the stringer preforms 107 are held in storage 125 for later use by the PNP stations 114 or other stations. In still further embodiments, the PNP stations 114 apply frame fillers (e.g., pad-ups for accommodating frames) while applying the stringer preforms 107, and the frame fillers are kitted with the stringer preforms 107 onto the trays 108 at desired locations. In still further embodiments, the stringer preforms 107 and the frame fillers are picked up in groups that are applied at once to the arcuate mandrel section 112.

The arcuate mandrel sections 112 are advanced in a process direction (P) indicated by the arrows of FIG. 1A. In one embodiment, the arcuate mandrel sections 112 are moved continuously in the process direction, while in further embodiments, the arcuate mandrel sections 112 are pulsed in the process direction, which can depending on the direction of the next station. Movement of the arcuate mandrel sections 112 by less than their length is referred to as a "micro pulse," while movement of the arcuate mandrel sections 112 by equal to or greater than their length is referred to as a "full pulse." In pulsed embodiments, the stations are capable of performing work on the arcuate mandrel sections 112 during pauses between pulses, and multiple stations perform work on the same arcuate mandrel section 112 during the same pause between pulses. In continuous motion embodiments, the stations can perform operations during motion of the arcuate mandrel sections 112. In further embodiments, two separate versions can be implemented. A first version is a "drive by" version wherein station tooling is fixed and performs work on an arcuate mandrel section 112 while the arcuate mandrel section 112 advances through or past the station. A second version is a "hitch hiker" version, wherein station tooling is physically connected to the arcuate mandrel section 112 and performs work at the arcuate mandrel section 112 while both are advancing, until a point is reached where the connection is broken and the station tooling returns to a beginning of the station. Both versions can be implemented to perform work on the same arcuate mandrel section 112 at the same time, depending on the type of fabrication process and work being performed. This discussion pertaining to the arcuate mandrel sections 112 is also applicable to fabrication processes relating to the stringer preforms 107, the combined mandrel 118, and other components that are moved at assembly line 100.

The arcuate mandrel sections 112 are advanced in process direction 199-4 and are assembled together into a combined mandrel 118 at mandrel assembly station 116, and the location of joining arcuate mandrel sections 112 can comprise a circumferential position of a stringer, depending on design. In embodiments where the location of joining is a circumferential position of a stringer, after assembly/joining is completed, additional ones of the stringer preforms 107 are placed at intersections between arcuate mandrel sections 112 that form the combined mandrel 118. The combined mandrel 118 is advanced in process direction 199-5 and process direction 199-6 to one or more layup stations 120, where a series of end effectors 123 layup fiber reinforced material 121 for one or more skin plies in order to create a preform 122 for a section of fuselage (e.g., a twenty-five or forty foot section of fuselage). The fiber reinforced material 121 is laid up upon the combined mandrel 118 and over stringer preforms 107 placed into the combined mandrel 118. The skin plies unite fiber reinforced material from the stringer preforms 107, causing the individual stringer preforms 107 to be integrated together by the skin plies, resulting in the preform 122. Each of the end effectors 123 and/or layup stations 120 lays up a different combination of plies and fiber orientations in order to complete the preform 122. Each layup station 120 is operable to layup fiber reinforced material 121 at a number of different orientations. Alternatively, multiple layup stations 120 are implemented that each layup is at a particular orientation. In one embodiment, the combined mandrel 118 is advanced continuously according to a takt time, and laying up fiber reinforced material 121 onto the combined mandrel 118 and laying up fiber reinforced material for the stringer preforms 107 is performed during advancement of the combined mandrel 118. In such an embodiment, multiple layup stations 120 may perform work on the combined mandrel 118 during the continuous advancement.

The preform 122 is advanced in process direction 199-7 to an Interwoven Wire Fabric (IWWF) and surfacer station 124, which lowers an IWWF 126-1 and a surfacer 126-2 (which may also be collectively referred to as "IWWF and surfacer 126"). These components can be placed at the same time, or separately, or can even be placed in combination as part of a placement/compaction step or together with a caul plate 134 and/or vacuum bag. In this embodiment, the IWWF 126-1 and surfacer 126-2 are placed onto the preform 122 for the fuselage section via a port 128. In the illustrated embodiment, the port 128 is disposed in a mezzanine 127, and the caul plate 134/vacuum bag, and the IWWF 126-1 and surfacer 126-2 are moved into place onto the preform 122 from a feeder line, by lowering from the elevation of the mezzanine 127. In this embodiment, instead of a feeder line providing feeder products at ground level, feeder lines may provide materials for the IWWF 126-1 and surfacer 126-2 at the height of the mezzanine 127. Input and output are therefore received from feeders into the station that are elevated. The IWWF 126-1 and the surfacer 126-2 are applied to (e.g., made integral with) the preform 122, such that after hardening the IWWF 126-1 and the surfacer 126-2 are an integral component of the resulting composite part 150.

After the preform 122 advances further in a process direction 199-8, a caul loading station 130 utilizes a port 132 in the mezzanine 127, to lower a caul plate 134 into place onto the preform 122. This enables the caul plate 134 to enter from a "third side" 135 (i.e., neither from the left nor the right of the preform 122). The caul plate 134 is sealed to the combined mandrel 118 onto which the preform 122 has been laid-up, and the caul plate 134 applies pressure during hardening that consolidates and ensures conformance with a desired Outer Mold Line (OML) for the composite part 150.

After the caul plate 134 is placed, the preform 122 is advanced in process direction 199-9 through an entrance 138 of the autoclave 136 and sealed into the autoclave 136. In one embodiment, the combined mandrel 118 itself forms a boundary of the autoclave 136 when moved into place, resulting in a "right sized" autoclave. The autoclave 136 operates at heat (e.g., a desired hardening temperature, such as hundreds of degrees Fahrenheit) and pressure (e.g., a desired compaction pressure, such as ninety pounds per square inch) to harden the preform 122 into a composite part 150. The composite part 150 is moved from the autoclave 136 in process direction 199-10 through a boundary 140 out of a clean room environment 191 and into a main factory floor 193. In one embodiment, the boundary 140 is disposed at the autoclave exit, and therefore the autoclave 136 functions as a doorway out of the clean room environment 191. In some embodiments, indexing features 152 such as holes are added to a manufacturing excess 151 of the composite part 150 at a demold station 142.

The combined mandrel 118 is then moved to a demold station 142 in a post hardening assembly environment (e.g., a non-clean room environment), wherein the composite part 150 is removed and sent to another assembly line to receive installation of frames, window surrounds, and other features. The caul plate 134 is cleaned and returned to the clean room environment via process direction 199-15. This can be achieved via a pulsed, micro pulsed or continuous line for cleaning and prepping, for reintroduction to the clean room environment 191 at the mezzanine 127. In a similar fashion, the combined mandrel 118 is advanced to a disassembly station 160 in process direction 199-11, where it is separated into individual arcuate mandrel sections 112 moving in process directions 199-12. The arcuate mandrel sections 112 move (e.g., are pulsed) along a return line 180 in process directions 199-13 that returns the arcuate mandrel sections 112 from a factory floor 193 to a clean room environment 191 at the start of the assembly line 100 as indicated by process direction 199-14. Return line 180 can be a pulsed, micro pulsed or continuous line for the clean and prep for reintroduction to the clean room. At the return line 180, the arcuate mandrel sections 112 are resurfaced and cleaned at one or more cleaning stations 170, which may comprise disassembly stations, cleaning stations, and resurfacing stations, and then returned to the clean room environment 191 for re-use in the assembly line 100 (as indicated by nodes "A"). In still further embodiments, a mandrel 105 for a stringer preform 107 is also pulsed, micro pulsed, or moved continuously along a line for the cleaning and preparation of the mandrel 105 prior to reintroduction into the clean room environment 191. This line can be all or partially outside of the clean room environment 191.

A controller 190 manages the operations of stations at the assembly line 100, and coordinates actions along the assembly line 100 to ensure actions are performed synchronously by the stations as desired. In some illustrative examples, the controller 190 is operable to enforce uniform work times across the at least one layup station 120, the at least one mandrel assembly station 116, and such that the laying up and uniting is coordinated and synchronized according to a common schedule. However, one or more controllers may be implemented to coordinate actions, and controller 190 does not have to be one centralized device. In some embodiments, controller 190 maintains and supplies Numerical Control (NC) programs to the stations, and tracks the timing of operations defined in such NC programs to ensure a desired level of synchronization in operations. In one embodiment, controller 190 is implemented as custom circuitry, as a hardware processor executing programmed instructions stored in memory, or some combination thereof.

Figure 1B:
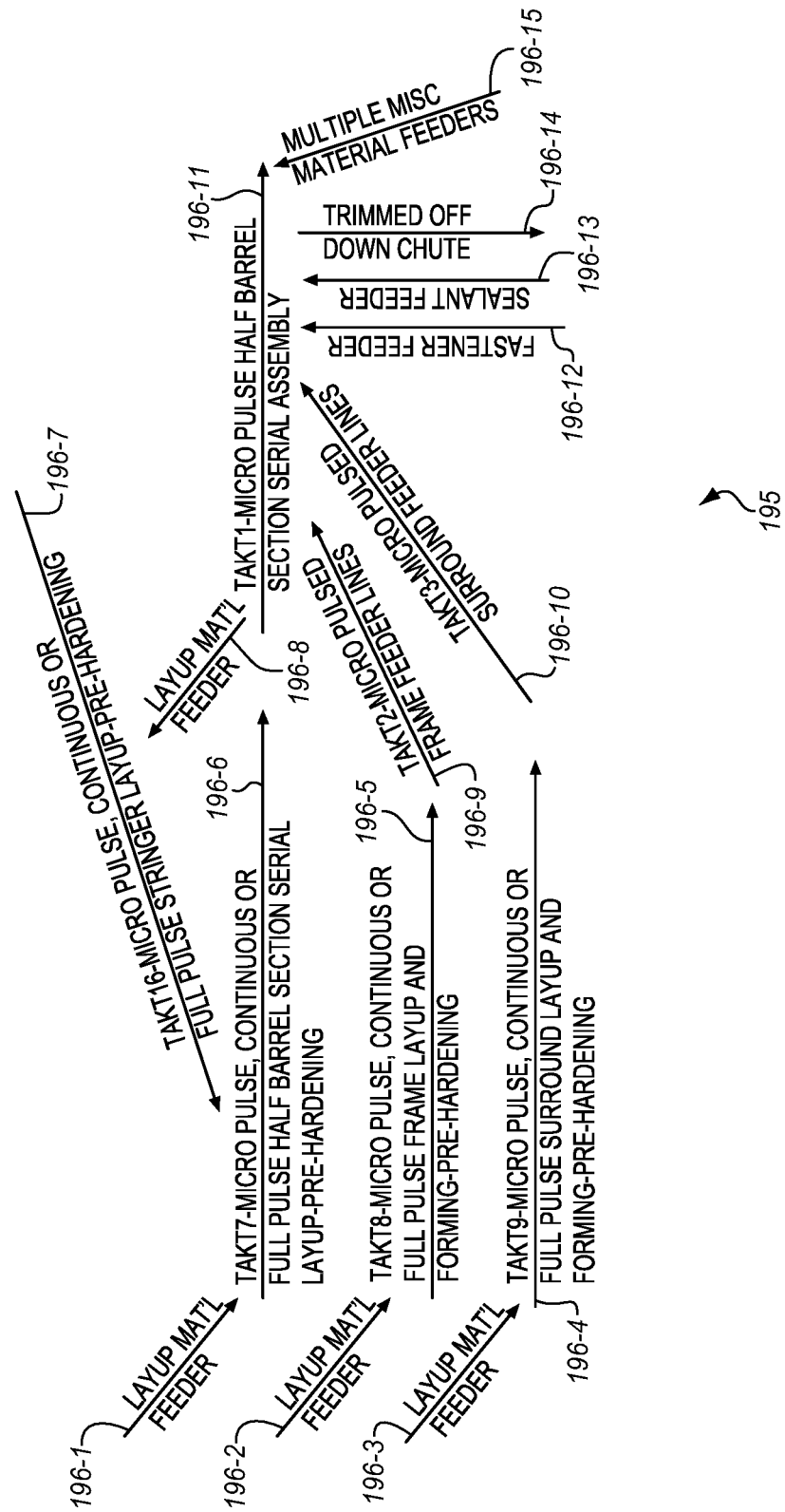
FIG. 1B depicts a conceptual assembly arrangement in an illustrative embodiment.

FIG. 1B depicts a conceptual assembly arrangement 195 in an illustrative embodiment. In FIG. 1B, feeder lines 196-1 through 196-13 and 196-15 feed a variety of other assembly lines according to a takt time (e.g., a desired production time for a product, such as an airplane or wing), and are synchronized to provide components to the other assembly lines just in time for fabrication. Specifically, feeder lines 196-1, 196-2, and 196-3 provide layup material such as tows of CFRP or broad goods, respectively, to feeder line 196-6 for fabricating a half-barrel or full-barrel section, feeder line 196-5 for laying up frames, and feeder line 196-4 for laying up surrounds, respectively. In this embodiment, feeder line 196-6 is also fed by a feeder line 196-7 for stringer preforms, which itself is fed via a feeder line 196-8 for layup materials.

Feeder line 196-5 feeds frames to a feeder line 196-9 for frames section (e.g., after hardening), and feeder line 196-4 feeds surrounds to a feeder line 196-10 for surrounds (e.g., door and window surrounds). The various components discussed above are fed to a feeder line 196-11 that performs serial assembly using input from feeder line 196-6, 196-9, and 196-10. The feeder line 196-11 also receives fasteners from feeder line 196-12, sealant from feeder line 196-13, and miscellaneous material from feeder line 196-15. Outflow 196-14 removes trimmed off or machined debris, scrap, etc. from the feeder line 196-11. Any of the feeder lines 196-1 through 196-15 and/or outflows discussed herein may be operated in a micro-pulsed, continuous, or full-pulsed manner according to the same or different takt time.

FIG. 1C depicts a conceptual assembly arrangement in an illustrative embodiment. This arrangement depicts an alternative embodiment for stringer layup to that depicted in FIG. 1A. According to FIG. 1C, mandrels 198-2 enter a track 198-5 (e.g., an oval track, rectangular track with square ends, etc.) along direction 198-6 and receive fiber reinforced material 198-1 from lamination station 198-3. The fiber reinforced material 198-1 is shaped by a forming station 198-4 that is downstream from the lamination station 198-3 and the forming station 198-4, and proceeds in directions 198-7, 198-8, 198-9, and 198-10. The mandrels 198-2 each proceed for multiple laps of the track 198-5 until a completed stringer preform in the same configuration as stringer preform 107) has been fabricated, at which time the mandrels 198-2 exit the track via direction 198-11 for further processing. In the embodiment depicted in FIG. 1C, laying up the fiber reinforced material comprises cycling the mandrels 198-2 through a lamination station 198-3 followed by a forming station 198-4 for multiple laps to form a preform for a stringer. In some illustrative examples, lamination station 198-3 may be referred to as a layup station.

Illustrative details of the operation of assembly line 100 will be discussed with regard to FIG. 2. Assume, for this embodiment, that stringer preforms 107 have been fabricated via stringer fabrication lines 110 and await placement onto arcuate mandrel sections 112.

FIG. 2 is a flowchart illustrating a method 200 for operating the assembly line of FIG. 1A in an illustrative embodiment. The steps of method 200 are described with reference to assembly line 100 of FIG. 1, but those skilled in the art will appreciate that method 200 may be performed in other systems. The steps of the flowcharts described herein are not all inclusive and may include other steps not shown. The steps described herein may also be performed in an alternative order.

The method 200 includes dispensing 202 fiber reinforced material for a preform (e.g., for preform 122) onto a first arcuate mandrel section 112. In this embodiment, dispensing 202 fiber reinforced material comprises picking and placing the stringer preforms 107 onto an arcuate mandrel section 112. However, in further embodiments this further comprises applying ply packs, frame fillers ("postage stamps"), barrier plies, etc., or laying up one or more plies of material directly onto the arcuate mandrel section 112. Thus, the dispensing 202 step includes placing whatever materials are needed for placement onto the arcuate mandrel section 112 prior to laying up a skin for a fuselage. The arcuate mandrel section 112 may then proceed further down the assembly line 100.

The method 200 includes dispensing 204 fiber reinforced material 121 for the preform 122 onto a second arcuate mandrel section 112. The dispensing 204 step may be performed in a similar manner to the dispensing 202 step recited above. However, the arrangement of stringer preforms 107 and the type of stringer preforms 107 that are placed at the second arcuate mandrel section 112 may be different from those placed on the first arcuate mandrel section 112, depending for example, on whether the second arcuate mandrel section 112 receives layup for a crown portion or lateral portion of fuselage. In one embodiment, the dispensing 204 step comprises picking and placing stringer preforms 107 onto a next arcuate mandrel section 112 that immediately follows the first arcuate mandrel section 112 down the assembly line 100. However, in further embodiments this further comprises applying ply packs, frame fillers ("postage stamps"), barrier plies, etc., or laying up one or more plies of material directly onto the arcuate mandrel section 112. Thus, dispensing 204 includes placing whatever materials are needed for placement onto the arcuate mandrel section 112 prior to laying up a skin for a fuselage.

Continuing, the first arcuate mandrel section 112 and the second arcuate mandrel section 112 are structurally united 206 to form a combined mandrel 118. The uniting 206 step is performed after the first arcuate mandrel section 112 and the second arcuate mandrel section 112 have received the fiber reinforced material 121 as discussed in the preceding paragraphs. In one embodiment, structurally uniting 206 the arcuate mandrel sections 112 is performed by placing the arcuate mandrel sections 112 onto a frame such that the arcuate mandrel sections 112 are adjacent to each other. In a further embodiment, structurally uniting 206 the arcuate mandrel sections 112 comprises bolting or fastening the arcuate mandrel sections 112 to each other while the arcuate mandrel sections 112 are chordwise adjacent. In one embodiment, each arcuate mandrel section 112 comprises a roughly sixty-degree portion of a full-barrel, and three arcuate mandrel sections 112 are assembled together to form the combined mandrel 118. Any suitable number of arcuate mandrel sections 112, each comprising any suitable arc segment, may be assembled together in this step to form the combined mandrel 118. Thus, while only three arcuate mandrel sections 112 are shown per combined mandrel 118 in FIG. 1, in further embodiments, different numbers of segments are used. The combined mandrel 118 then receives additional stringer preforms 107 (e.g., at intersections between constituent arcuate mandrel sections), and is moved to a layup station 120. In a further embodiment, only underlying material is applied when dispensing 202, 204, but in further embodiments underlying material is applied, then a skin is applied prior to joining arcuate mandrel sections 112 together. The skins are then spliced together when the arcuate mandrel sections 112 are assembled together. Thus, the uniting 206 step may include splicing dispensed fiber reinforced material 121 for the preform 122 on a first arcuate mandrel section 112 with fiber reinforced material 121 on a second arcuate mandrel section 112.

Finally, fiber reinforced material 121 that completes the preform 122 is dispensed 208, by making the fiber reinforced material 121 dispensed 202 onto the first arcuate mandrel section 112 integral with fiber reinforced material 121 dispensed onto the second arcuate mandrel section 112. In one embodiment, this comprises layup station 120 laying up one or more skin plies atop a surface of the combined mandrel 118 that defines an Inner Mold Line (EVIL) for the preform 122. The skin plies form an arc that covers the stringer preforms 107, and therefore after hardening, the skin plies and the stringer preforms 107 form part of the same composite part 150 for a section of fuselage. In a further embodiment, dispensing 208 comprises picking and placing additional preforms, ply packs, or other components onto the combined mandrel 118.

Method 200 provides a substantial benefit over prior techniques because it enables large composite parts 150 to be laid up on a piecewise basis at a variety of smaller mandrels (e.g., arcuate mandrel sections 112, mandrels 105) via standardized processes. The smaller mandrels are then united and made integral with additional plies to form a completed preform 122. This streamlines layup processes by increasing speed while also reducing layup difficulty. This also facilitates parallel processing, which increases fabrication rates.

Figure 3A:
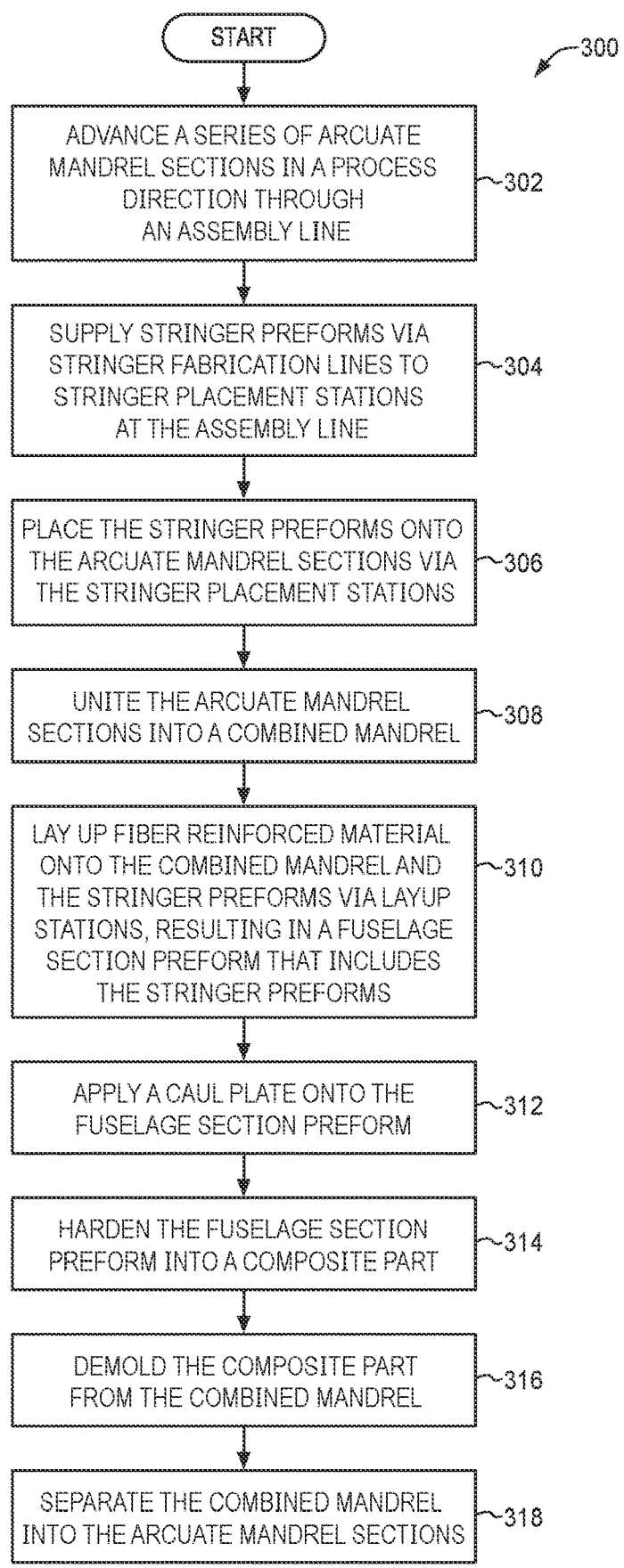
FIG. 3A is a flowchart illustrating a further method for operating the assembly line of FIG. 1A in an illustrative embodiment.

FIG. 3A is a flowchart illustrating a further method 300 for operating the assembly line of FIG. 1A in an illustrative embodiment. Method 300 describes fabrication processes in a similar, but distinct manner from method 200 of FIG. 2.

Initially, a series of arcuate mandrel sections 112 are advanced 302 (e.g., pulsed) in a process direction through an assembly line 100 (i.e., the same assembly line, feeder line 196-6 of FIG. 1B, etc.). As discussed above, the arcuate mandrel sections 112 can be micro-pulsed or full-pulsed along the assembly line 100 as desired, depending on design considerations. In one embodiment, the arcuate mandrel sections 112 are advanced 302 along a powered track (e.g., a conveyor, or a series of stanchions that each are topped with a powered roller), while in further embodiments the arcuate mandrel sections 112 are carried by Automated Guided Vehicles (AGVs) or other conveyances. The arcuate mandrel sections 112 (or lengthwise portions thereof) are indexed to the stations at the assembly line 100 during pauses between the pulses.

In one embodiment, the arcuate mandrel sections 112 are pulsed by less than a length of the arcuate mandrel sections 112 in a process direction along the assembly line 100. In a further embodiment, the arcuate mandrel sections 112 are pulsed by at least a length of the arcuate mandrel sections 112 in a process direction along the assembly line 100. In yet another embodiment, the arcuate mandrel sections 112 are continuously advanced in a process direction along the assembly line 100.

Stringer preforms 107 are supplied 304 via stringer fabrication lines 110 (e.g., feeder line 196-7 of FIG. 1B) to the stringer placement stations 113 (e.g., PNP stations 114) at the assembly line 100 (e.g., feeder line 196-6 of FIG. 1B). In one embodiment, the stringer preforms 107 are supplied 304 JIT to the PNP stations 114, and an end of the stringer fabrication lines 110 couples with an input for the PNP stations 114. Because the dimension and shape of each stringer preform 107 may vary depending on the section of fuselage being fabricated, JIT supply of stringer preforms 107 that match the shape and size requirements of the PNP stations 114 as those requirements change across time is highly beneficial. Thus, coordination of stringer fabrication processes with PNP processes is useful in order to ensure that the correct stringer preform 107 is fabricated and supplied 304 at the correct time to a PNP station 114. In a further embodiment, stringer preforms 107 from the stringer fabrication lines 110 are kept in storage 125 and then retrieved JIT for use by the PNP stations 114.

The stringer preforms 107 are placed 306 onto the arcuate mandrel sections 112 via the stringer placement stations 113 (e.g., the PNP stations 114). In embodiments where the arcuate mandrel sections 112 are pulsed, the stringer preforms 107 are placed 306 during pauses between pulses of the arcuate mandrel sections 112. In one embodiment, the PNP stations 114 each place 306 entire batches of stringer preforms 107 at once onto the arcuate mandrel section 112. Thus, the stringer preforms 107 are placed 306 in batches that include multiple stringer preforms 107. In further embodiments, the PNP stations 114 place 306 the stringer preforms 107 singularly to the arcuate mandrel section 112. Thus, desired materials and components (e.g., stringer preforms, etc.) are placed 306 onto the arcuate mandrel sections 112 prior to skin layup.

The arcuate mandrel sections 112 are united 308 into a combined mandrel 118. In one embodiment, structurally uniting 308 the arcuate mandrel sections 112 is performed by placing the arcuate mandrel sections 112 onto a frame such that the arcuate mandrel sections 112 are chordwise adjacent to each other (i.e., joined along adjacent longitudinal edges). In a further embodiment, structurally uniting 308 the arcuate mandrel sections 112 comprises bolting or fastening the arcuate mandrel sections 112 to each other.

Fiber reinforced material 121 is laid-up 310 onto the combined mandrel 118 and the stringer preforms 107 via layup stations 120, resulting in a fuselage section preform 122 that includes the stringer preforms 107. Fiber reinforced material 121 is laid-up 310 onto the combined mandrel 118 and the stringer preforms 107 to form a skin layup. This step forms the fuselage skin of the section (e.g., composite part 150). This step is performed via one or more layup stations 120. In one embodiment, each of the layup stations 120 lays up 310 a different combination of plies and fiber orientations. In one embodiment, where the combined mandrel 118 is pulsed, the operations are performed during pauses between pulses of the combined mandrel 118. The operations of the layup stations 120 result in a fuselage section preform (i.e., preform 122) that includes the stringer preforms 107. In one embodiment, this comprises operating the end effectors 123 to dispense tows of fiber reinforced material 121, or to place sheets of fiber reinforced broad goods onto the combined mandrel 118. In some illustrative examples, the at least one layup station 120 comprises at least one end effector 123, the at least one end effector 123 operable to dispense tows of fiber reinforced material 121 onto the arcuate mandrel sections 112. In some illustrative examples, the at least one layup station 120 comprises at least one end effector 123, the at least one end effector 123 operable to place sheets of fiber reinforced broad goods onto the arcuate mandrel sections 112. In some illustrative examples, laying up 310 the fiber reinforced material 121 onto the arcuate mandrel sections 112 comprises at least one of: operating at least one end effector 123 to dispense tows of fiber reinforced material 121 onto the arcuate mandrel sections 112; and placing sheets of fiber reinforced broad goods onto the arcuate mandrel sections 112.

A caul plate 134 is applied 312 to the fuselage section preform 122. This comprises lowering the caul plate 134 over the combined mandrel 118, and sealing the caul plate 134 (which also operates as a vacuum bag) to the combined mandrel 118 just beyond the perimeter of the preform 122. When a vacuum is applied to a space between the caul plate 134 and the combined mandrel 118, the caul plate 134 is drawn tightly against the preform 122, which enforces a desired OML shape onto the preform 122 during hardening.

The fuselage section preform 122 is hardened 314 into a composite part 150. This is performed by inserting the combined mandrel 118 into an autoclave 136 (e.g., in a right-sized autoclave that is bounded in-part by the combined mandrel 118) and operating the autoclave 136 at a hardening temperature (e.g., a curing temperature for thermoset resins, or a melt temperature for thermoplastics) and pressure while a vacuum is drawn between the caul plate 134 and the combined mandrel 118 for a desired period of time (e.g., four hours, eight hours, etc.).

The combined mandrel 118 exits the autoclave 136, and a resulting composite part thereon receives additional operations such as adding indexing features to a manufacturing excess 151 of the composite part 150, and trimming an edge of the composite part 150 to form a bearing edge. Thus, the composite part 150 is demolded 316 from the combined mandrel 118 at demold station 142. In one embodiment, demolding 316 comprises iteratively and variably flexing the composite part 150 by increasing amounts in order to dislodge the composite part 150 from the combined mandrel 118. The composite part 150 then proceeds to a post-hardening assembly line for further processing and integration into an airframe.

The combined mandrel 118 is separated 318 into the arcuate mandrel sections 112 (e.g., by unbolting or unfastening the arcuate mandrel sections 112 from each other or an underlying frame). The arcuate mandrel sections 112 are then cleaned/resurfaced and returned to the assembly line 100.

Method 300 provides a substantial benefit over prior techniques because, in a similar manner to method 200, it enables large composite parts to receive layup on a piecewise basis at a variety of smaller mandrels, which are then united and made integral with layup to form a completed preform 122. This streamlines layup processes by increasing speed while also reducing layup difficulty.

Figure 3B:
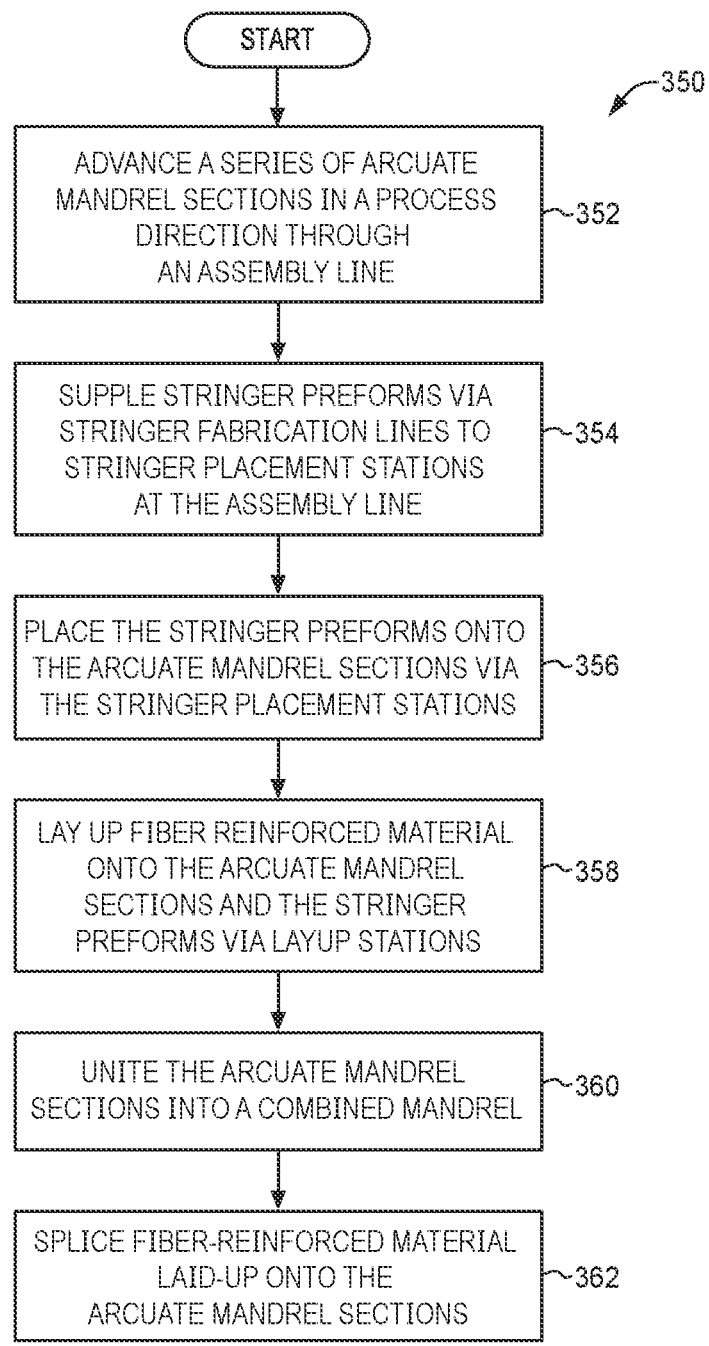
FIG. 3B is a flowchart illustrating a further method for operating the assembly line of FIG. 1A in an illustrative embodiment.

FIG. 3B is a flowchart illustrating a further method 350 for operating the assembly line of FIG. 1A in an illustrative embodiment. Method 350 includes advancing 352 a series of arcuate mandrel sections 112 in a process direction through an assembly line (e.g., feeder line 196-6 of FIG. 1B). The method includes supplying 354 stringer preforms 107 via stringer fabrication lines 110 (e.g., feeder line 196-7 of FIG. 1B) to stringer placement stations 113 at the assembly line 100. The stringer preforms 107 are placed 356 onto the arcuate mandrel sections 112 via stringer placement stations 113 at the assembly line (e.g., feeder line 196-6 of FIG. 1B). Fiber reinforced material 121 is laid up 358 onto the arcuate mandrel sections 112 and the stringer preforms 107 via layup stations 120 disposed prior to the mandrel assembly station 116. In some illustrative examples, laying up 310 the fiber reinforced material 121 onto the arcuate mandrel sections 112 comprises simultaneously laying up 310 the fiber reinforced material 121 onto the arcuate mandrel sections 112 via a plurality of layup stations 120. In some illustrative examples, laying up 310 the fiber reinforced material 121 onto the arcuate mandrel sections 112 comprises advancing the arcuate mandrel sections 112 through a plurality of layup stations 120 via one or both of a continuous advancement or a pulsed advancement. In one embodiment, this comprises operating layup stations 120 disposed along the assembly line 100. The arcuate mandrel sections 112 are united 360 into a combined mandrel 118. Fiber reinforced material 121 is spliced 362, that is, laid-up onto the arcuate mandrel sections 112, and may be performed via the layup stations 120 discussed above, or additional layup stations 120 that may receive layup materials from a feeder line 196-1. This results in a fuselage section preform 122.

Figure 4:
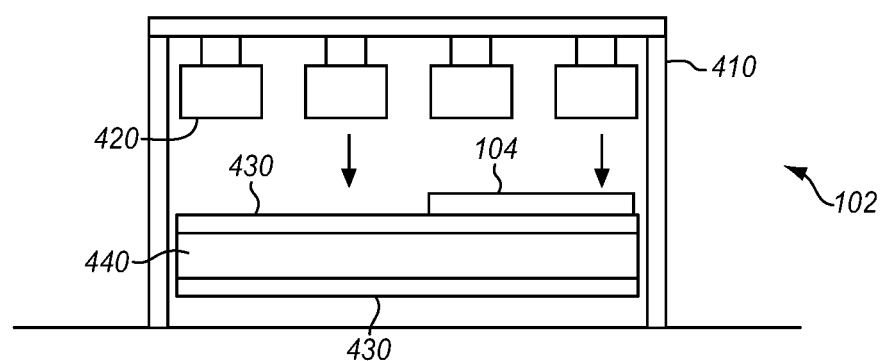
FIG. 4 illustrates a flat charge layup station for stringer preforms in an illustrative embodiment.

With a discussion provided above of the fabrication process for a preform 122 for a section of fuselage, the following FIGS. 4-10 illustrate specific components and systems for performing one or more steps of these processes. Specifically, FIG. 4 depicts further details of layup for a flat charge 104, FIGS. 5A-5B depict operations of a forming machine that shapes a flat charge 104 into a stringer preform 107, FIGS. 6A-6B depict placement of stringer preform 107 onto an arcuate mandrel section 112, FIG. 7 depicts a fully formed combined mandrel 118, in a half-barrel configuration, FIGS. 8A-8B depicts layup processes onto the combined mandrel 118 to fabricate a preform 122, FIGS. 9A-9C depict placement of IWWFs 126-1, surfacers 126-2, and caul plates 134 onto a preform 122, and FIGS. 10A-10F depict hardening processes at an autoclave 136.

FIG. 4 illustrates a lamination station 102 for stringer preforms 107 in an illustrative embodiment, and corresponds with view arrows 4 of FIG. 1A. In this embodiment, the lamination station 102 includes multiple heads 420 that each dispense tows of material to form a flat charge 104. The heads 420 are mounted to a frame 410, and move along the frame 410 (which in one embodiment is a gantry) to desired locations for laying up material. The frame 410 provides structural strength to the lamination station 102 while also enabling movement of the heads 420. A conveyor 440 moves flat charges 104 into and/or out of the page via belt 430). By iteratively moving a flat charge 104 into and out of the page, the conveyor 440 enables each of the heads 420 to lay up multiple layers of fiber reinforced material 121 at any desired combination of fiber orientations (e.g., +/−45°, 0°, 90°).

Figure 5A:
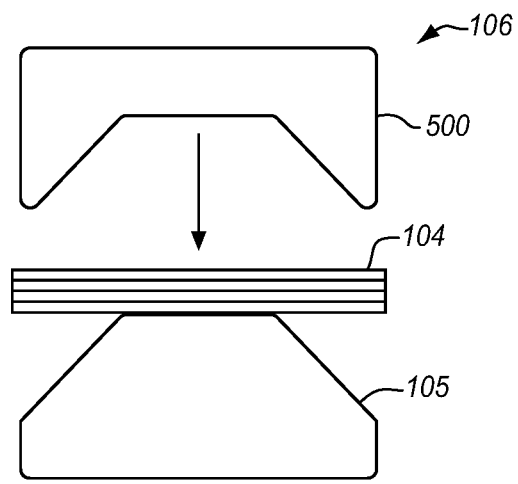
FIGS. 5A-5B illustrate operation of a forming station for stringer preforms in an illustrative embodiment.
Figure 5B:
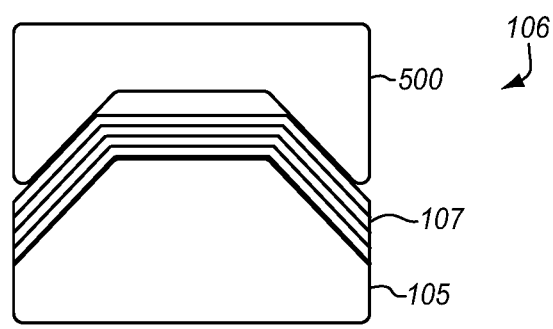

FIGS. 5A-5B illustrate operation of a forming station 106 for stringer preforms 107 in an illustrative embodiment, and correspond with view arrows 5 of FIG. 1. In this embodiment, the forming station 106 drives a forming head 500 onto a flat charge 104 that rests at a shaped mandrel 105. This shapes a portion of the flat charge 104 into a desired shape for a stringer preform 107. While 4 plies are shown, this can be achieved by placing and forming two or a few plies, followed by placing and forming additional plies in an iterative manner until the full layup is placed and formed. Another portion of the flat charge 104 is then advanced into the page and formed, and the process continues iteratively (e.g., back and forth on a track) until the entire flat charge 104 has been shaped into a stringer preform 107. In further embodiments, the stringer preform 107 also includes additional layers, shaped components, and/or flat charges 104 (e.g., in order to form a hat stringer, Z stringer, C stringer, etc.) that are placed after leaving the forming station 106.

Figure 6A:
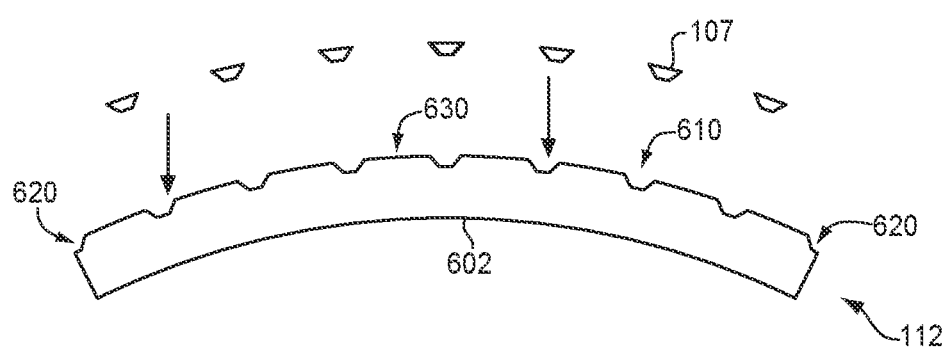
FIGS. 6A-6B illustrate an arcuate mandrel section before and after placement of stringer preforms in an illustrative embodiment.
Figure 6B:
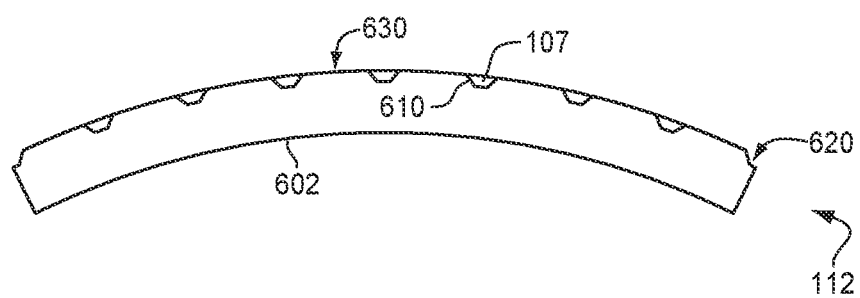

FIGS. 6A-6B illustrate an arcuate mandrel section 112 before and after placement of stringer preforms 107 in an illustrative embodiment. Specifically, FIG. 6A corresponds with view arrows 6A of FIG. 1, and FIG. 6B corresponds with view arrows 6B of FIG. 1A. In FIG. 6A, the arcuate mandrel section 112 includes a body 602 that defines an IML surface 630 for a fuselage section preform 122, and also includes troughs 610 for receiving stringer preforms 107. In further embodiments, additional accommodations in the arcuate mandrel section 112 are provided for frame fillers ("postage stamps") or similar structures that are placed before the skin is laid-up. The arcuate mandrel section 112 also includes partial troughs 620. The partial troughs 620 become full troughs after joining with other partial troughs 620 in other arcuate mandrel sections 112. The resulting completed troughs 622 of FIG. 7A will receive stringer preforms 107 after the arcuate mandrel section is assembled into a combined mandrel 118. In FIG. 6B, stringer preforms 107 are placed into the troughs 610. Outer edges of the stringer preforms 107 conform with the EVIL surface 630 after placement and compaction of the stringer preforms 107 at the arcuate mandrel section 112. The OML side of the stringer preforms 107 provide a portion of a layup surface for the skin when the stringers are compacted into the arcuate mandrel section 112.

Figure 7A:
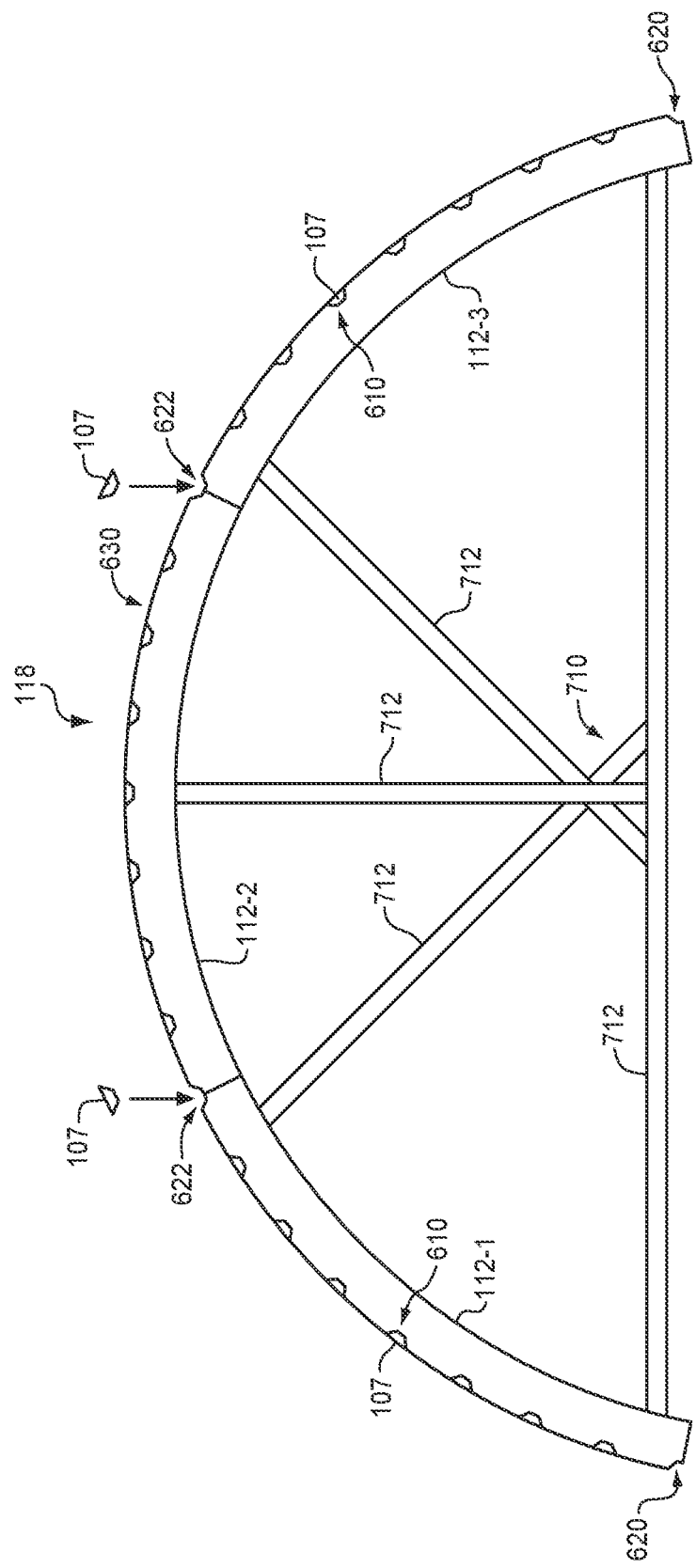

FIGS. 7A-7B illustrate a combined mandrel 118, assembled from arcuate mandrel sections 112. While the arcuate mandrel sections 112-1 through 112-3 are of the same design in this embodiment, in further embodiments the arcuate mandrel sections for the left side (arcuate mandrel section 112-1), right side (arcuate mandrel section 112-3), and crown (arcuate mandrel section 112-2) are not interchangeable. For example, the arc lengths, or the number of partial troughs 620, or the number of stringer preforms 107 at different arcuate mandrel sections 112 can be varied as a matter of design that receives stringer preforms 107 in an illustrative embodiment. In this embodiment, the arcuate mandrel sections 112 have received the stringer preforms 107 prior to assembly into the combined mandrel 118. The combined mandrel 118 is held together by bolting or otherwise affixing arcuate mandrel sections 112 to the elements 712 of frame 710. After combined mandrel 118 has been assembled, partial troughs 620 from different arcuate mandrel sections 112 are united together, resulting in full completed troughs 622. Stringer preforms 107 are then placed into these full completed troughs 622 as shown in FIG. 7B.

FIGS. 8A-8B depict layup of skin plies of fiber reinforced material 121 onto a combined mandrel 118 in an illustrative embodiment, and correspond with view arrows 8 of FIG. 1A. In FIG. 8A, end effectors 123 that are movably attached to a frame 810 of a layup station 120 are disposed over IML surface 630. The end effectors 123 are adjustably mounted to frame 810 of the layup station 120 in order to enable dynamic motion vertically and laterally (as indicated by the various arrows of this FIG.) and operation within the layup station 120. The end effectors 123 dispense tows of fiber reinforced material 121 onto the EVIL surface 630, resulting in one or more skin plies 830 shown in FIG. 8B. The skin plies 830 integrate the stringer preforms 107 from the different arcuate mandrel sections 112 together, and also integrate the stringers or the particular arcuate mandrel section 112 together. This results in a single integral preform 122 for a section of fuselage.

FIGS. 9A-9C illustrate layup of an Interwoven Wire Fabric (IWWF) layer 126-1 for a preform 122, as well as placement of a caul plate 134 onto a preform 122 in an illustrative embodiment. The IWWF layer 126-1 facilitates dispersion of electrical energy that may be received by the airplane. FIGS. 9A-9C correspond with view arrows 9 of FIG. 1A, and depict a mezzanine 127 onto which one or more stations (i.e., IWWF and surfacer station 124 of FIG. 1, caul loading station 130 of FIG. 1) are disposed. In FIG. 9A, a first combined mandrel 118 having a preform 122 is disposed beneath an IWWF and surfacer station 124, while a second combined mandrel 118 is disposed beneath a caul loading station 130. Cables 910, which are driven by actuated elements at gantries 920, hold an IWWF 126-1 and a surfacer 126-2 and a caul plate 134 over the first combined mandrel 118 and second combined mandrel 118, respectively. In further embodiments, the operations of the IWWF and surfacer station 124 are separated across multiple stations such that the IWWF 126-1 and the surfacer 126-2 are separately applied. In another embodiment as shown in FIG. 1A, these multiple steps are performed at the same IWWF and surfacer station 124. In still further embodiments, the IWWF 126-1, surfacer 126-2 and caul plate 134 are all placed at once in one station. In FIG. 9B, the IWWF 126-1 and the surfacer 126-2 are lowered (together or separately with respect to each other) until they are poised over a preform 122, and then placed. For example, in one embodiment, the IWWF 126-1 is lowered and placed onto a combined mandrel 118, and then the surfacer 126-2 is lowered and placed onto the combined mandrel 118. The caul plate 134 is lowered via the caul loading station 130 until it is poised over a prior-applied IWWF 126-1 and surfacer 126-2, and then is placed. The caul plate 134, the IWWF 126-1, and the surfacer 126-2 are installed at respective combined mandrels 118 that are directly beneath them in FIG. 9C, and the combined mandrels 118 each advance to the next station towards an autoclave, and a new combined mandrel 118 is moved into position below the IWWF and surfacer station 124.

Mezzanine 127, port 128, and port 132 enable IWWF and surfacer station 124, as well as the caul loading station 130, to access the combined mandrels 118, while also enabling materials such as caul plates 134 to be repeatedly looped back via the mezzanine 127 for reconditioning for re-use inside a clean room environment 191 after exiting the clean room environment 191. Mezzanine 127 therefore helps to move a caul plate 134 (that also performs vacuum bagging functions) in the area around the autoclaves 136 from a demold station 142 back to the mezzanine 127. The caul plate 134 is removed post autoclave 136 and then reconditioned as it transitions back into the clean room environment 191, at least in part on the mezzanine 127 thus saving floor space. In further embodiments, the mezzanine 127 uses dedicated crane facilities which help to avoid overburdening roof/ceiling crane facilities.

FIGS. 10A-10D depict hardening of preforms 122 via multiple combined mandrels 118 within an autoclave 136 in an illustrative embodiment, and correspond with view arrows 10 of FIG. 1A. That is, the autoclave 136 is dimensioned to hold multiple combined mandrels 118 at once, while hardening the preforms 122 thereupon. The autoclave 136 includes a body 1020 having a heater 1040, as well as one or more pumps 1030 that pressurize an interior 1050 of the autoclave 136. The autoclave 136 forms a boundary 1010 between a clean room environment 191 and a non-clean room environment, for example factory floor 193, such that travel from right to left in the illustration moves the combined mandrel 118 through the autoclave 136 out of the clean room environment 191 and into a non-clean room environment.

In FIG. 10A, a first door 1022 of the autoclave 136 is opened. This exposes the interior 1050 of the autoclave 136 for receiving the combined mandrels 118. In FIG. 10B, the combined mandrels 118 advance into the interior 1050, and in FIG. 10C, the first door 1022 and a second door 1023 are closed, sealing the interior 1050. Heat (A) and pressure is applied via arrows 1059 until preforms 122 upon the combined mandrels 118 are hardened. Then second door 1023 is opened and the combined mandrels 118 and the now hardened composite part 150 proceed into the non-clean room environment, or factory floor 193. The process is repeated to iteratively cycle multiple combined mandrels 118 through the autoclave 136 at a time.

FIGS. 10E-10F depict hardening of multiple preforms 122 upon combined mandrels 118 within an autoclave 136 in an illustrative embodiment, and correspond with view arrows 10 of FIG. 1A. FIGS. 10E-10F depict an alternate embodiment to that shown in FIGS. 10A-10D. The autoclave 136 does not include doors, because ends 1062 of the combined mandrels 118, in combination with seals 1070 are used to seal preforms 122 upon the combined mandrels 118 into place for hardening. During operation, the combined mandrels 118 are inserted into an interior 1050 of the autoclave 136 and the autoclave 136 is sealed to the combined mandrels 118 to form at least one vacuum chamber 1051. While the combined mandrels 118 are inserted into the autoclave 136, the combined mandrels 118 and the autoclave 136, along with seals 1070, define the vacuum chamber 1051 for preforms 122. That is, the seals 1070 seal a perimeter of the combined mandrels 118 to an inner surface 1053 of the autoclave 136. The seals 1070 may comprise rigid or other thermal barriers for sealing a gap (G) (e.g., an arcuate gap) by clamping to the autoclave 136 to form a pressure/vacuum chamber 1051. The seals 1070 may form an arcuate shape and may comprise rigid segments of material between the combined mandrels 118 and the autoclave 136.

The autoclave 136 is dimensioned to complement the combined mandrels 118, and hence is right-sized for the components, such as composite parts 150, that it heats and hardens. Hence, the vacuum chamber 1051 is smaller than traditional chambers (and smaller than the autoclave in FIGS. 10A-10D). This means that heat and pressure applied to the vacuum chamber 1051 is applied to a smaller volume than in traditional autoclaves, which increases heating efficiency and hardening speed. This also means that the autoclave 136 has less thermal mass, and that smaller pieces of equipment may be used to pressurize the autoclave 136 (e.g., with air or nitrogen gas or other inert fluids).

The autoclave 136 can be operated according to a desired takt time (e.g., production rate) in order to fabricate composite parts. For example, if a desired fabrication rate for a fuselage segment is one per eight hours, the autoclave 136 may be operated to harden preforms 122 upon two combined mandrels 118 in tandem per sixteen hours. This in turn may dictate other takt times for other stations in the line that fabricate preforms 122 for hardening and/or a post hardening assembly line.

EXAMPLES

In the following examples, additional processes, systems, and methods are described in the context of an assembly line for fabricate fuselage section preforms.

Figure 11:
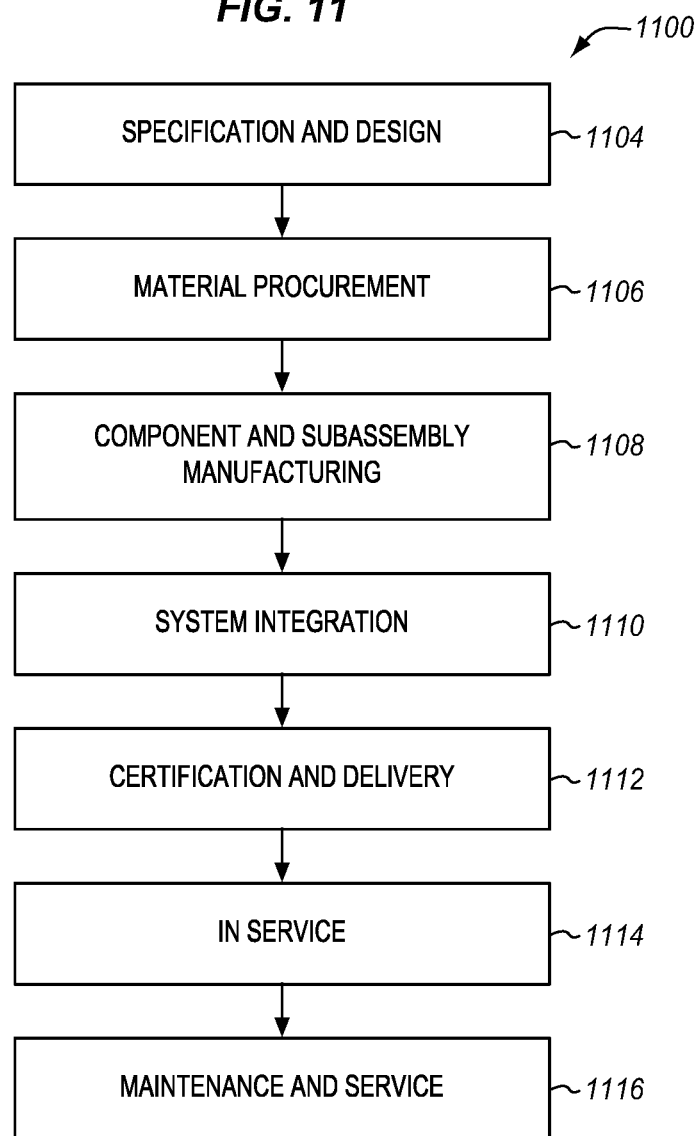
FIG. 11 is a flow diagram of aircraft production and service methodology in an illustrative embodiment.
Figure 12:
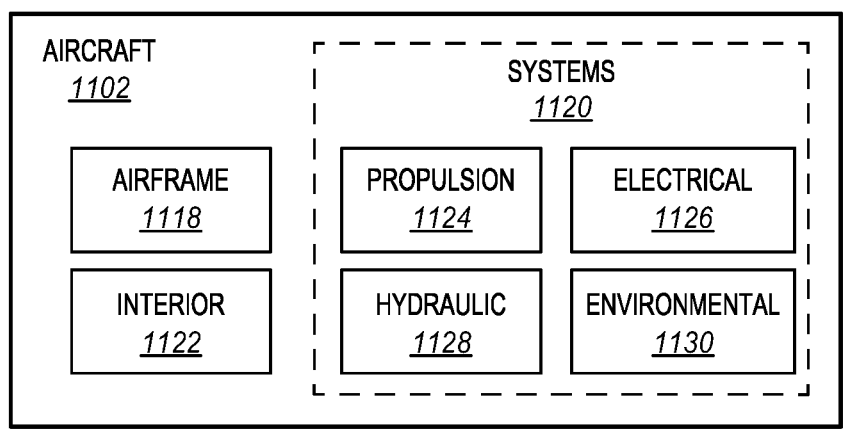
FIG. 12 is a block diagram of an aircraft in an illustrative embodiment.

Referring more particularly to the drawings, embodiments of the disclosure may be described in the context of aircraft manufacturing and service in method 1100 as shown in FIG. 11 and an aircraft 1102 as shown in FIG. 12. During pre-production, method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine work in maintenance and service 1116 (which may also include modification, reconfiguration, refurbishment, and so on). Apparatus and methods embodied herein may be employed during any one or more suitable stages of the production and service described in method 1100 (e.g., specification and design 1104, material procurement 1106, component and subassembly manufacturing 1108, system integration 1110, certification and delivery 1112, in service 1114, maintenance and service 1116) and/or any suitable component of aircraft 1102 (e.g., airframe 1118, systems 1120, interior 1122, propulsion system 1124, electrical system 1126, hydraulic system 1128, environmental system 1130).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by method 1100 may include an airframe 1118 with a plurality of systems 1120 and an interior 1122. Examples of systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1100. For example, components or subassemblies corresponding to component and subassembly manufacturing 1108 may be fabricated or manufactured in a manner similar to components or subassemblies produced while the aircraft 1102 is in service. Also, one or more apparatus embodiments, method embodiments, or a combination thereof may be utilized during the subassembly manufacturing 1108 and system integration 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation during the maintenance and service 1116. Thus, the invention may be used in any stages discussed herein, or any combination thereof, such as specification and design 1104, material procurement 1106, component and subassembly manufacturing 1108, system integration 1110, certification and delivery 1112, in service 1114, maintenance and service 1116 and/or any suitable component of aircraft 1102 (e.g., airframe 1118, systems 1120, interior 1122, propulsion system 1124, electrical system 1126, hydraulic system 1128, and/or environmental system 1130).

In one embodiment, a part comprises a portion of airframe 1118, and is manufactured during component and subassembly manufacturing 1108. The part may then be assembled into an aircraft in system integration 1110, and then be utilized in service 1114 until wear renders the part unusable. Then, in maintenance and service 1116, the part may be discarded and replaced with a newly manufactured part. Inventive components and methods may be utilized throughout component and subassembly manufacturing 1108 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Further, the disclosure comprises examples according to the following clauses:

Clause 1. A method 300 for fabricating a preform 122 for a fuselage section of an aircraft 1102, the method 300 comprising: advancing 302 a series of arcuate mandrel sections 112 in a process direction 199 through an assembly line 100; placing 306 stringer preforms 107 onto the arcuate mandrel sections 112 via stringer placement stations 113; uniting 308 the series of arcuate mandrel sections 112 into a combined mandrel 118; and laying up 310 fiber reinforced material 121 onto the combined mandrel 118 and the stringer preforms 107.

Clause 2. The method 300 according to clause 1 further comprising placing additional stringer preforms 107 into troughs 622 formed by the uniting of the arcuate mandrel sections 112.

Clause 3. The method 300 according to clause 1 further comprising operating a stringer fabrication line 110 to supply stringer preforms 107) to the assembly line 100 at a takt time.

Clause 4. The method 300 of clause 1 further comprising: advancing the combined mandrel 118 with the fiber reinforced material 121 thereon to be under a port 128 in a mezzanine 127; and lowering at least one of a sheet of IWWF 126-1, a sheet of surfacer 126-2, and a caul plate 134 through the port 128 and onto the fiber reinforced material 121.

Clause 5. The method 300 of clause 1 further comprising: advancing the combined mandrel 118 with the fiber reinforced material 121 thereon to be under a port 128 in a mezzanine 127; lowering at least one of a sheet of IWWF 126-1 and a sheet of surfacer 126-2 through the port 128 and onto the fiber reinforced material 121; advancing the combined mandrel 118 with the fiber reinforced material 121 and the at least one of a sheet of IWWF 126-1 and a sheet of surfacer 126-2 thereon to be under a second port 132 in the mezzanine 127; and applying 312 a caul plate 134 through the second port 132 and onto the at least one of a sheet of IWWF 126-1 and a sheet of surface 126-2.

Clause 6. The method 300 of clause 1 wherein placing 306 stringer preforms 107 onto the arcuate mandrel sections 112 comprises placing 306 the stringer preforms 107 during pauses between pulses of the arcuate mandrel sections 112 along the assembly line 100.

Clause 7. The method 300 of clause 1 wherein placing 306 stringer preforms 107 onto the arcuate mandrel sections 112 comprises placing 306 the stringer preforms 107 as the arcuate mandrel sections 112 move continuously along the assembly line 100.

Clause 8. The method 300 of clause 1 wherein laying up 310 fiber reinforced material 121 onto the combined mandrel 118 and the stringer preforms 107 comprises uniting the stringer preforms 107 and the fiber reinforced material 121 into an integral preform 122.

Clause 9. The method 300 according to clause 1 the advancing comprises enforcing a uniform work time across multiple stations within which the placing, uniting and laying up is performed enabling operations between the stations to be coordinated and synchronized according to a common schedule.

Clause 10. The method 300 according to clause 9 wherein the common schedule is based on a time span of an autoclave heating cycle.

Clause 11. The method 300 according to clause 1 wherein placing the stringer preforms 107 onto the arcuate mandrel sections 112 comprises: laying up and trimming flat charges 104 of fiber reinforced material at one or more lamination stations 102; shaping the flat charges 104 into stringer preforms 107 at one or more forming stations 106; and placing the stringer preforms 107 onto the arcuate mandrel sections 112 at one or more placement stations.

Clause 12. The method 300 according to clause 11 wherein the laying up and shaping are performed along a track 109, a mandrel 105 for the stringer preforms 107 cycling through a lamination station 102 and a forming station 106 multiple times before exiting the track 109.

Clause 13. The method 300 according to clause 1 wherein placing the stringer preforms 107 onto the arcuate mandrel sections 112 further comprises applying at least one of frame fillers, ply packs, and barrier plies to the arcuate mandrel section 112 while placing the stringer preforms 107.

Clause 14. The 300 method according to clause 1 wherein laying up 310 fiber reinforced material 121 onto the combined mandrel 118 and the stringer preforms 107 comprises advancing the combined mandrel 118 through a plurality of layup stations 120 via one or both of a continuous advancement or a pulsed advancement.

Clause 15. The 300 method according to clause 1 wherein laying up 310 fiber reinforced material 121 onto the combined mandrel 118 and the stringer preforms 107 comprises simultaneously laying up 310 fiber reinforced material 121 onto the combined mandrel 118 via a plurality of layup stations 120.

Clause 16. The method 300 according to clause 1 further comprising: advancing the combined mandrel 118, with at least the fiber reinforced material 121 thereon through a first door 1022 of an autoclave 136; hardening 314 the fiber reinforced material 121 within the autoclave 136; advancing the combined mandrel 118 and a composite part 150 formed from the fiber reinforced material 121 through a second door 1023 in the autoclave 136; demolding 316 the composite part 150 from the combined mandrel 118; separating 318 the combined mandrel 118 into arcuate mandrel sections 112; and cleaning the arcuate mandrel sections 112.

Clause 17. The method 300 according to clause 1 wherein uniting 308 the series of arcuate mandrel sections 112 comprises placing the arcuate mandrel sections 112 onto a frame 710 such that the arcuate mandrel sections 112 are adjacent to each other.

Clause 18. The method 300 according to clause 1 wherein uniting 308 the series of arcuate mandrel sections 112 comprises fastening the arcuate mandrel sections 112 to each other while the arcuate mandrel sections 112 are chordwise adjacent.

Clause 19. The method 300 according to clause 1 wherein uniting 308 the series of arcuate mandrel sections 112 into a combined mandrel 118 comprises uniting the series of arcuate mandrel sections 112 for the forming of a half-barrel section of fuselage.

Clause 20. The method 300 according to clause 1 wherein uniting 308 the series of arcuate mandrel sections 112 into a combined mandrel comprises uniting the series of arcuate mandrel sections 112 for the forming of a full-barrel section of fuselage.

Clause 21. The method 300 according to clause 1 wherein laying up 310 fiber reinforced material 121 onto the combined mandrel 118 and the stringer preforms 107 comprises at least one of: operating at least one end effector 123 to dispense tows of fiber reinforced material 121 onto the combined mandrel 118; and placing sheets of fiber reinforced broad goods onto the combined mandrel 118.

Clause 22. A system for fabricating a preform 122 for a fuselage section of an aircraft 1102, the system comprising: a series of arcuate mandrel sections 112 that are advanced in a process direction 199 through an assembly line 100; at least one stringer placement station 113 operable to place stringer preforms 107 onto the arcuate mandrel sections 112; at least one mandrel assembly station 116 operable to unite the series of arcuate mandrel sections 112 into a combined mandrel 118; and at least one layup station 120 operable to layup fiber reinforced material 121 onto the combined mandrel 118 and the stringer preforms 107.

Clause 23. The system according to clause 22 wherein at least one stringer placement station 113 is operable to place stringer preforms 107 into troughs 622 formed by the uniting of the arcuate mandrel sections 112.

Clause 24. The system according to clause 22 further comprising at least one stringer fabrication line 110 operable to supply stringer preforms 107 to the assembly line 100 at a takt time.

Clause 25. The system of clause 22 further comprising a mezzanine 127 comprising a first port 128 therethrough, the mezzanine 127 operable to lower at least one of a sheet of IWWF 126-1, a sheet of surface 126-2, and a caul plate 134 through the port 128 and onto the fiber reinforced material 121 on the combined mandrel 118.

Clause 26. The system of clause 22 further comprising a mezzanine 127 comprising a first port 128 and a second port 132 therethrough, the mezzanine 127 operable to lower at least one of a sheet of IWWF 126-1 and a sheet of surface 126-2 through the first port 128 and onto the fiber reinforced material 121 on the combined mandrel 118, and further operable to lower a caul plate 134 through the second port 132 and onto the at least one of a sheet of IWWF 126-1 and a sheet of surface 126-2.

Clause 27. The system of clause 22 wherein the at least one stringer placement station 113 is operable to place stringer preforms 107 onto the arcuate mandrel sections 112 during pauses between pulses of the arcuate mandrel sections 112 along the assembly line 100.

Clause 28. The system of clause 22 wherein the at least one stringer placement station 113 is operable to place stringer preforms 107 onto the arcuate mandrel sections 112 as the arcuate mandrel sections 112 move continuously along the assembly line 100.

Clause 29. The system of clause 22 wherein the at least one layup station 120 is operable to layup the fiber reinforced material 121 such that the stringer preforms 107 and the fiber reinforced material 121 are united into an integral preform 122.

Clause 30. The system of clause 22 further comprising: at least one lamination station 102 configured to layup and trim flat charges 104 of fiber reinforced material; at least one forming station 106 configured to shape the flat charges 104 into stringer preforms 107; and at least one placement station configured to place the stringer preforms 107 onto the arcuate mandrel sections 112.

Clause 31. The system of clause 30 further comprising a mandrel 105 for the forming of the stringer preforms 107.

Clause 32. The system of clause 31 further comprising a track 109, the mandrel 105 for the stringer preforms 107 operable to cycle through the at least one lamination station 102 and the at least one forming station 106 multiple times before exiting the track 109.

Clause 33. The system of clause 30 wherein the at least one placement station is operable to apply at least one of frame fillers, ply packs, and barrier plies to the arcuate mandrel section 112 while placing the stringer preforms 107.

Clause 34. The system of clause 22 wherein advancement of the series of arcuate mandrel sections 112 in a process direction 199 comprises one or both of a continuous advancement or a pulsed advancement.

Clause 35. The system of clause 22 wherein the at least one mandrel assembly station 116 comprises a frame 710, the at least one mandrel assembly station 116 is operable to unite the series of arcuate mandrel sections 112 by placing the arcuate mandrel sections 112 onto the frame 710 such that the arcuate mandrel sections 112 are adjacent to each other.

Clause 36. The system of clause 22 wherein the at least one mandrel assembly station 116 is operable to unite the series of arcuate mandrel sections 112 by fastening the arcuate mandrel sections 112 to each other while the arcuate mandrel sections 112 are chordwise adjacent.

Clause 37. The system of clause 22 wherein the at least one mandrel assembly station 116 is operable to unite the series of arcuate mandrel sections 112 to form a half-barrel section of fuselage.

Clause 38. The system of clause 22 wherein the at least one mandrel assembly station 116 is operable to unite the series of arcuate mandrel sections 112 to form a full-barrel section of fuselage.

Clause 39. The system of clause 22 wherein the at least one layup station 120 comprises at least one end effector 123, the at least one end effector 123 operable to dispense tows of fiber reinforced material 121 onto the combined mandrel 118.

Clause 40. The system of clause 22 wherein the at least one layup station 120 comprises at least one end effector 123, the at least one end effector 123 operable to place sheets of fiber reinforced broad goods onto the combined mandrel 118.

Clause 41. The system of clause 22 further comprising a controller 190, the controller 190 operable to enforce uniform work times across the at least one stringer placement station 113, the at least one mandrel assembly station 116, and the at least one layup station 120 such that the placing, uniting and laying up is coordinated and synchronized according to a common schedule.

Clause 42. The system of clause 41 wherein the common schedule is based on a time span of an autoclave 136 heating cycle.

Clause 43. The system of clause 22 further comprising: at least one lamination station 102 configured to layup and trim flat charges 104 of fiber reinforced material; and at least one forming station 106 configured to shape the flat charges 104 into stringer preforms 107, the controller 190 further operable to coordinate and synchronize operations of the at least one lamination station 102, the at least one forming station 106, and the at least one stringer placement station 113 according to the common schedule.

Clause 44. A method 300 for fabricating a preform 122 for a fuselage section of an aircraft 1102, the method comprising: advancing 302 a series of arcuate mandrel sections 112 in a process direction 199 through an assembly line 100; placing 306 stringer preforms 107 onto the arcuate mandrel sections 112 via stringer placement stations 113; uniting 308 the series of arcuate mandrel sections 112 into a combined mandrel 118; and laying up 310 fiber reinforced material 121 onto the combined mandrel 118 and the stringer preforms 107; advancing the combined mandrel 118, with at least the fiber reinforced material 121 thereon through a first door 1022 of an autoclave 136; hardening 314 the fiber reinforced material 121 within the autoclave 136; advancing the combined mandrel 118 and a composite part 150 formed from the fiber reinforced material 121 through a second door 1023 to exit the autoclave 136; demolding 316 the composite part 150 from the combined mandrel 118; separating 318 the combined mandrel 118 into arcuate mandrel sections 112; and cleaning the arcuate mandrel sections 112.

Clause 45. The method of clause 1 wherein placing 306 stringer preforms 107 onto the arcuate mandrel sections 112 comprises placing 306 batches of stringer preforms 107 at once onto the arcuate mandrel sections 112.

Clause 46. The system according to clause 22 wherein at least one stringer placement station 113 is operable to place 306 batches of stringer preforms 107 onto the arcuate mandrel sections 112.

Although specific embodiments are described herein, the scope of the disclosure is not limited to those specific embodiments. The scope of the disclosure is defined by the following claims and any equivalents thereof.

What is claimed is:

1. A method for fabricating a preform for a fuselage section of an aircraft, the method comprising:

advancing a series of arcuate mandrel sections in a process direction through an assembly line;
laying up fiber reinforced material onto the arcuate mandrel sections via layup stations;
uniting the series of arcuate mandrel sections into a combined mandrel; and
splicing the fiber reinforced material laid-up onto the arcuate mandrel sections.

2. The method of claim 1, further comprising:
placing stringer preforms onto the arcuate mandrel sections via stringer placement stations prior to laying up fiber reinforced material onto the arcuate mandrel sections.

3. The method according to claim 2, further comprising placing additional stringer preforms into troughs formed by the uniting of the arcuate mandrel sections.

4. The method according to claim 2, further comprising operating a stringer fabrication line to supply stringer preforms to the assembly line at a takt time.

5. The method of claim 2, wherein placing the stringer preforms onto the arcuate mandrel sections comprises placing the stringer preforms during pauses between pulses of the arcuate mandrel sections along the assembly line.

6. The method of claim 2, wherein placing the stringer preforms onto the arcuate mandrel sections comprises placing the stringer preforms as the arcuate mandrel sections move continuously along the assembly line.

7. The method of claim 2, wherein placing the stringer preforms onto the arcuate mandrel sections comprises:
laying up and trimming flat charges of fiber reinforced material at one or more lamination stations;
shaping the flat charges into stringer preforms at one or more forming stations; and
placing the stringer preforms onto the arcuate mandrel sections at one or more placement stations.

8. The method according to claim 7, wherein the laying up and shaping are performed along a track, a mandrel for the stringer preforms cycling through a lamination station and a forming station multiple times before exiting the track.

9. The method of claim 1, further comprising:
advancing the combined mandrel with the fiber reinforced material thereon to be under a port in a mezzanine; and
lowering at least one of a sheet of IWWF, a sheet of surfacer, and a caul plate through the port and onto the fiber reinforced material.

10. The method of claim 1, further comprising:
advancing the combined mandrel with the fiber reinforced material thereon to be under a port in a mezzanine;
lowering at least one of a sheet of IWWF and a sheet of surfacer through the port and onto the fiber reinforced material;
advancing the combined mandrel with the fiber reinforced material and the at least one of a sheet of IWWF and a sheet of surfacer thereon to be under a second port in the mezzanine; and
applying a caul plate through the second port and onto the at least one of a sheet of IWWF and a sheet of surface.

11. The method according to claim 1, wherein the advancing comprises enforcing a uniform work time across multiple stations within which the laying up, uniting, and splicing is performed enabling operations between the stations to be coordinated and synchronized according to a common schedule.

12. The method according to claim 1, wherein laying up the fiber reinforced material onto the arcuate mandrel sections comprises simultaneously laying up the fiber reinforced material onto the arcuate mandrel sections via a plurality of layup stations.

13. The method according to claim 1, further comprising:
advancing the combined mandrel, with at least the fiber reinforced material thereon through a first door of an autoclave;
hardening the fiber reinforced material within the autoclave;
advancing the combined mandrel and a composite part formed from the fiber reinforced material through a second door in the autoclave;
demolding the composite part from the combined mandrel;
separating the combined mandrel into arcuate mandrel sections; and
cleaning the arcuate mandrel sections.

14. The method according to claim 1, wherein uniting the series of arcuate mandrel sections comprises placing the arcuate mandrel sections onto a frame such that the arcuate mandrel sections are adjacent to each other.

15. The method according to claim 1, wherein uniting the series of arcuate mandrel sections comprises fastening the arcuate mandrel sections to each other while the arcuate mandrel sections are chordwise adjacent.

16. The method according to claim 1, wherein uniting the series of arcuate mandrel sections into the combined mandrel comprises uniting the series of arcuate mandrel sections to form a half-barrel section of fuselage.

17. The method according to claim 1, wherein uniting the series of arcuate mandrel sections into the combined mandrel comprises uniting the series of arcuate mandrel sections to form a full-barrel section of fuselage.

18. A method for fabricating a preform for a fuselage section of an aircraft, the method comprising:
advancing a series of arcuate mandrel sections in a process direction through an assembly line;
placing stringer preforms onto the arcuate mandrel sections via stringer placement stations;
laying up fiber reinforced material onto the arcuate mandrel sections via layup stations;
uniting the series of arcuate mandrel sections into a combined mandrel;
splicing the fiber reinforced material laid-up onto the arcuate mandrel sections;
advancing the combined mandrel, with at least the fiber reinforced material thereon through a first door of an autoclave;
hardening the fiber reinforced material on the combined mandrel within the autoclave;
advancing the combined mandrel and a composite part formed from the fiber reinforced material through a second door to exit the autoclave;
demolding the composite part from the combined mandrel;
separating the combined mandrel into arcuate mandrel sections; and
cleaning the arcuate mandrel sections.

19. The method of claim 18, further comprising placing additional stringer preforms into troughs formed by the uniting of the arcuate mandrel sections.

20. The method of claim 18, further comprising operating a stringer fabrication line to supply stringer preforms to the assembly line at a takt time.

21. The method of claim 18, wherein placing the stringer preforms onto the arcuate mandrel sections comprises placing the stringer preforms during pauses between pulses of the arcuate mandrel sections along the assembly line.

22. The method of claim 18, wherein placing the stringer preforms onto the arcuate mandrel sections comprises placing the stringer preforms as the arcuate mandrel sections move continuously along the assembly line.

23. The method of claim 18, wherein the advancing comprises enforcing a uniform work time across multiple stations within which the laying up, uniting, and splicing is performed enabling operations between the stations to be coordinated and synchronized according to a common schedule.

24. A method for fabricating a preform for a fuselage section of an aircraft, the method comprising:
   advancing a series of arcuate mandrel sections in a process direction through an assembly line;
   placing stringer preforms onto the arcuate mandrel sections via stringer placement stations;
   laying up fiber reinforced material onto the arcuate mandrel sections via layup stations;
   uniting the series of arcuate mandrel sections into a combined mandrel; and
   splicing the fiber reinforced material laid-up onto the arcuate mandrel sections.

25. The method of claim 24, further comprising placing additional stringer preforms into troughs formed by the uniting of the arcuate mandrel sections.

26. The method of claim 24, further comprising operating a stringer fabrication line to supply stringer preforms to the assembly line at a takt time.

27. The method of claim 24 further comprising:
   advancing the combined mandrel with the fiber reinforced material thereon to be under a port in a mezzanine; and
   lowering at least one of a sheet of IWWF, a sheet of surfacer, and a caul plate through the port and onto the fiber reinforced material.

28. The method of claim 24, wherein placing the stringer preforms onto the arcuate mandrel sections comprises placing the stringer preforms during pauses between pulses of the arcuate mandrel sections along the assembly line.

29. The method of claim 24, wherein placing the stringer preforms onto the arcuate mandrel sections comprises placing the stringer preforms as the arcuate mandrel sections move continuously along the assembly line.

30. The method of claim 24, wherein the advancing comprises enforcing a uniform work time across multiple stations within which the laying up, uniting, and splicing is performed enabling operations between the stations to be coordinated and synchronized according to a common schedule.

* * * * *